(12) United States Patent
Zhu et al.

(10) Patent No.: US 8,323,797 B2
(45) Date of Patent: Dec. 4, 2012

(54) COMPOSITE ARTICLE HAVING EXCELLENT FIRE AND IMPACT RESISTANCE AND METHOD OF MAKING THE SAME

(75) Inventors: Bizhong Zhu, Midland, MI (US); Carl Allen Fairbank, Midland, MI (US); Raymond Lee Tabler, Midland, MI (US); Nathan P. Greer, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 336 days.

(21) Appl. No.: 12/527,870

(22) PCT Filed: Feb. 21, 2008

(86) PCT No.: PCT/US2008/002304
§ 371 (c)(1),
(2), (4) Date: Aug. 20, 2009

(87) PCT Pub. No.: WO2008/103419
PCT Pub. Date: Aug. 28, 2008

(65) Prior Publication Data
US 2010/0104877 A1 Apr. 29, 2010

Related U.S. Application Data

(60) Provisional application No. 60/891,165, filed on Feb. 22, 2007, provisional application No. 61/007,418, filed on Dec. 12, 2007.

(51) Int. Cl.
*B32B 17/10* (2006.01)
*B32B 27/36* (2006.01)
(52) U.S. Cl. .......... 428/412; 428/34; 428/421; 428/422; 428/429; 428/436; 428/437; 428/441; 428/442; 428/920; 428/921

(58) Field of Classification Search .................. 428/34, 428/412, 421, 422, 429, 436, 437, 441, 442, 428/920, 921
See application file for complete search history.

(56) References Cited

U.S. PATENT DOCUMENTS
3,312,574 A 4/1967 Laur
(Continued)

FOREIGN PATENT DOCUMENTS
DE 2826261 A1 1/1979
(Continued)

OTHER PUBLICATIONS
PCT International Search Report for PCT/US2007/009359, dated Sep. 10, 2007, 4 pages.
(Continued)

*Primary Examiner* — D. S. Nakarani
(74) *Attorney, Agent, or Firm* — Howard & Howard Attorneys PLLC

(57) ABSTRACT

A composite article comprises a first glass layer, a silicone layer, a second glass layer, and an organic layer. The silicone layer is disposed adjacent to the first glass layer. The silicone layer includes a cured silicone composition. The second glass layer is disposed adjacent to the silicone layer, spaced from and substantially parallel to the first glass layer. The organic layer is disposed adjacent to the second glass layer, spaced from and substantially parallel to the silicone layer. The organic layer includes a cured organic composition. A method of making a composite article including a first glass layer and a polymeric layer disposed adjacent to the first glass layer includes providing a dual-compartment chamber. The chamber includes a first compartment and a second compartment separated by a polymeric separator. The separator can be manipulated through pressure differentials between the compartments. Pressure is applied to at least one of the silicone layer and the first glass layer with the polymeric separator.

18 Claims, 2 Drawing Sheets

U.S. PATENT DOCUMENTS

| | | | |
|---|---|---|---|
| 3,312,587 A | 4/1967 | Wilson | |
| 3,419,593 A | 12/1968 | Willing | |
| 3,424,642 A | 1/1969 | Orcutt | |
| 3,616,839 A | 11/1971 | Burrin | |
| 4,087,585 A | 5/1978 | Schulz | |
| 4,152,188 A | 5/1979 | Friedrich et al. | |
| 4,260,780 A | 4/1981 | West | |
| 4,276,424 A | 6/1981 | Peterson, Jr. et al. | |
| 4,314,956 A | 2/1982 | Baney et al. | |
| 4,324,901 A | 4/1982 | West et al. | |
| 4,510,094 A | 4/1985 | Drahnak | |
| 4,530,879 A | 7/1985 | Drahnak | |
| 4,720,856 A | 1/1988 | Pace et al. | |
| 4,766,176 A | 8/1988 | Lee et al. | |
| 5,017,654 A | 5/1991 | Togashi et al. | |
| 5,061,333 A | 10/1991 | Ishikawa et al. | |
| 5,194,649 A | 3/1993 | Okawa | |
| 5,449,560 A | 9/1995 | Antheunis et al. | |
| 5,496,961 A | 3/1996 | Dauth et al. | |
| 5,653,839 A | 8/1997 | Itoh et al. | |
| 5,716,424 A | 2/1998 | Mennig et al. | |
| 5,908,704 A | 6/1999 | Friedman et al. | |
| 5,972,512 A | 10/1999 | Boisvert et al. | |
| 6,159,606 A | 12/2000 | Gelderie et al. | |
| 7,624,780 B2 | 12/2009 | Stevens | |
| 8,088,449 B2 | 1/2012 | Bailey et al. | |
| 8,092,910 B2 | 1/2012 | Bailey et al. | |
| 2004/0166332 A1 | 8/2004 | Zhu et al. | |
| 2006/0240262 A1 | 10/2006 | Zhu et al. | |
| 2008/0051548 A1 | 2/2008 | Bailey et al. | |
| 2008/0115827 A1 | 5/2008 | Woods et al. | |
| 2008/0138525 A1 | 6/2008 | Bailey et al. | |
| 2009/0155577 A1 | 6/2009 | Anderson et al. | |
| 2010/0051920 A1 | 3/2010 | Katsoulis et al. | |
| 2010/0093242 A1 | 4/2010 | Katsoulis et al. | |
| 2010/0146886 A1 | 6/2010 | Zhu et al. | |

FOREIGN PATENT DOCUMENTS

| | | |
|---|---|---|
| DE | 3032233 A1 | 3/1981 |
| DE | 10218198 C1 | 12/2003 |
| DE | 10337577 A1 | 3/2005 |
| EP | 0304898 A2 | 3/1989 |
| EP | 0755080 A2 | 1/1997 |
| FR | 2394394 A1 | 1/1979 |
| GB | 2045161 A | 10/1980 |
| JP | 54-039428 A | 3/1979 |
| JP | 58102432 A | 6/1983 |
| JP | 4333792 A2 | 11/1992 |
| JP | 08-252888 A | 10/1996 |
| JP | 10095068 A | 4/1998 |
| JP | 11-100241 | 4/1999 |
| JP | 2000-167988 A | 6/2000 |
| JP | 2001-064046 | 3/2001 |
| JP | 2001-505149 A | 4/2001 |
| JP | 2002191712 A | 7/2002 |
| JP | 2003012350 A | 1/2003 |
| JP | 2006315901 A | 11/2006 |
| JP | 2008-530339 A | 8/2008 |
| JP | 2008-530340 A | 8/2008 |
| JP | 2009-503230 A | 1/2009 |
| WO | WO 99/00247 A1 | 1/1999 |
| WO | WO 2004013255 A1 | 2/2004 |
| WO | WO 2006000300 A1 | 1/2006 |
| WO | WO 2006/088645 A1 | 8/2006 |
| WO | WO 2006/088646 A1 | 8/2006 |
| WO | WO 2007018756 A1 | 2/2007 |
| WO | WO 2007092032 A2 | 8/2007 |
| WO | WO 2007092118 A2 | 8/2007 |
| WO | WO 2007097835 A2 | 8/2007 |
| WO | WO 2007120905 A2 | 10/2007 |
| WO | WO 2007121006 A2 | 10/2007 |
| WO | WO 2007123898 A1 | 11/2007 |
| WO | WO 2007123901 A1 | 11/2007 |
| WO | WO 2007145885 A2 | 12/2007 |
| WO | WO 2008013611 A1 | 1/2008 |
| WO | WO 2008042056 A1 | 4/2008 |
| WO | WO 2008045104 A2 | 4/2008 |
| WO | WO 2008051242 A2 | 5/2008 |
| WO | WO 2008079179 A1 | 7/2008 |
| WO | WO 2008088407 A1 | 7/2008 |
| WO | WO 2008097435 A1 | 8/2008 |
| WO | WO 2008103226 A1 | 8/2008 |
| WO | WO 2008103228 A1 | 8/2008 |
| WO | WO 2008103229 A1 | 8/2008 |
| WO | WO 2008103407 A1 | 8/2008 |
| WO | WO 2008103411 A1 | 8/2008 |
| WO | WO 2008103419 A2 | 8/2008 |
| WO | WO 2008134241 A1 | 11/2008 |
| WO | WO 2008137262 A2 | 11/2008 |
| WO | WO 2009007786 A2 | 1/2009 |

OTHER PUBLICATIONS

PCT International Search Report for PCT/US2007/009364, dated Feb. 29, 2008, 3 pages.

PCT International Search Report for PCT/US2007/009365, dated Sep. 10, 2007, 4 pages.

PCT International Search Report for PCT/US2008/002287, dated Jul. 16, 2008, 4 pages.

PCT International Search Report for PCT/US2008/002292, dated Jul. 16, 2008, 4 pages.

PCT International Search Report for PCT/US2008/002304, dated Oct. 24, 2008, 6 pages.

Article: Guo et al., "Highly Active Visible-Light Photocatalysts for Curing a Ceramic Precursor", Chemistry of Materials, 1998, No. 10, pp. 531-536.

Document: #AFRL-SR-AR-TR-05-0037, Dow Corning "Final Report Feb. 1, 2005—Development of Silicone Substrates to be used with CIGS Deposition", 62 pages.

English language abstract for DE 2828261 extracted from Delphion.com database, dated May 13, 2006, 24 pages.

English language abstract for DE3032233 extracted from espacenet.com database, dated Dec. 14, 2009, 27 pages.

English language abstract for DE10218198 extracted from espacenet.com database, dated Dec. 14, 2009, 7 pages.

English language abstract for DE10337577 extracted from espacenet.com database, dated Dec. 22, 2009, 7 pages.

English language abstract for JP 58102432 extracted from espacenet.com database, dated Dec. 18, 2009, 5 pages.

English language abstract for JP4333792 extracted from espacenet.com database, dated Dec. 22, 2009, 5 pages.

English language translation and abstract for JP 10095068 extracted from PAJ database, dated Dec. 21, 2009, 22 pages.

English language translation and abstract for JP 2002-191712 extracted from PAJ database, dated Apr. 20, 2009, 27 pages.

English language translation and abstract for JP 2003-012350 extracted from PAJ database, dated Apr. 20, 2009, 26 pages.

English language translation and abstract for JP2006-315901 extracted from PAJ database, dated Dec. 14, 2009, 40 pages.

English language abstract for WO 2006-000300 extracted from espacenet.com database, dated Dec. 14, 2009, 27 pages.

No English abstract available for JP 54-039428; however, see equivalent FR 2394394 and its machine translation exported from the espacenet.com database on May 18, 2012, 26 pages.

English language abstract and translation for JP 11-100241 extracted from the PAJ database on Sep. 12, 2012, 25 pages.

English language abstract and translation for JP 2001-064046 extracted from the PAJ database on Sep. 12, 2012, 38 pages.

English language abstract not available for JP 2001-505149; However, see English language equivalent US 5,908,704. Orginal Document extracted from the espacenet.com database on Sep. 12, 2012, 32 pages.

English language abstract not available for JP 2008-530339; However, see English language equivalent US 8,088,449. Original Document extracted from the espacenet.com database on Sep. 12, 2012, 23 pages.

English language abstract not available for JP2008-530340; However, see English language equivalent US 8,092,910. Original Document extracted from the espacenet.com database on Sep. 12, 2012, 39 pages.

English language abstract not available for JP 2009-503230; However, see English language equivalent US 2009/0155577. Original Document extracted from the espacenet.com database on Sep. 12, 2012, 19 pages.

English language abstract and translation for JP 08-252888 extracted from the PAJ database on Sep. 12, 2012, 31 pages.

English language abstract and translation for JP 2000-167988 extracted from the PAJ database on Sep. 12, 2012, 21 pages.

COMPOSITE ARTICLE HAVING EXCELLENT FIRE AND IMPACT RESISTANCE AND METHOD OF MAKING THE SAME

RELATED APPLICATIONS

This patent application claims priority to and all the advantages of International Patent Application No. PCT/US2008/002304, filed on Feb. 21, 2008, which claims priority to U.S. Provisional Patent Application Nos. 60/891,165 and 61/007,418, which were filed on Feb. 22, 2007 and Dec. 12, 2007, respectively.

BACKGROUND OF THE INVENTION

1. Field of the Invention

The present invention generally relates to a composite article that has excellent impact strength and fire resistance. More specifically, the present invention relates to a composite article having layers that provide the composite article with impact and fire resistance.

2. Description of the Prior Art

Fire-rated glass and windows are known for use in the residential, commercial, and industrial construction industries, as well as the consumer appliance and automotive industries, for preventing fire, smoke, or extreme heat from propagating through buildings or to contain heat or fire within a space, such as in an oven. Fire-rated glass and windows are typically rated for either 30, 60, 90, or 120 minutes, depending on how long it takes for the fire-rated glass and windows to fail when the fire-rated glass and windows are exposed to a predefined fire condition leading to an exposure temperature of 843° C. after 30 minutes, 926° C. after 60 minutes, 1010° C. after 120 minutes, and 1093° C. after 240 minutes from startup. For example, a 30 minute rated glass or window fails when the window is exposed to the above predefined fire condition for a period of over 30 minutes. Possible measures of failure can include through-holes that allow flame penetration, evolution of hot gas capable of igniting cotton balls on a side of the glass or window that is not directly exposed to the fire condition (i.e., an unexposed side of the glass or window) at a certain distance from the glass or window, flame appearing and lasting on the unexposed side of the glass or window, outer side temperature exceeding requirements, or collapse of the glass or window under hose stream impact, depending on the specification of a particular rating in a particular geographic location.

Much work has been done to develop fire-rated glass and windows that have sufficient fire-ratings. The fire-rated glass is typically formed from a series of layers, including conventional glass layers and a layer that provides the fire resistance to the glass. Many different materials have been used to form the layer that provides the fire resistance; however, many of the materials used to form the layer that provides the fire resistance have shortcomings. For example, when carbon-based materials, especially primarily carbon-based materials having more than 50 parts by weight carbon, based on the total weight of all molecules in the material, are used to form the layer that provides the fire resistance, the materials will eventually emit excessive amounts of smoke and toxic gases.

Other non-carbon based materials that will not emit as much smoke and toxic gases, as compared to when primarily carbon-based materials are used, have also been used for the layer that provides the fire resistance. For example, inorganic silicon-based materials have been used in the layer that provides the fire resistance in the fire-rated windows. Specific examples of inorganic silicon-based materials include alkali metal polysilicate hydrate, as disclosed in U.S. Pat. No. 6,159,606 to Gelderie et al., a composition obtained through hydrolysis and condensation of silicates, as disclosed in U.S. Pat. No. 5,716,424 to Mennig et al., and a silicone elastomer, as disclosed in German Patent Application No. 2826261. Although the inorganic silicon-based materials will char, the inorganic silicon-based materials produce less smoke and toxic gas, as compared to primarily carbon-based materials. However, existing fire-rated windows including layers formed from the silicon-based materials are extremely labor intensive to fabricate, heavy, and sometimes insufficiently able to maintain structural integrity upon failure under heat. More specifically, once the breach forms in the fire-rated windows due to heat, the fire-rated windows are prone to mechanical failure. Similar deficiencies exist for other applications where fire protective or resistant transparent articles are used. Examples include fire rated doors and curtain walls.

Due to the deficiencies of the existing fire-rated glass and windows, it would be advantageous to provide a composite article having excellent impact strength and fire resistance that is lighter in weight, is easy to fabricate, and maintains excellent structural integrity even after failure of the composite article under heat.

SUMMARY OF THE INVENTION AND ADVANTAGES

The subject invention provides a composite article comprising a first glass layer, a silicone layer, a second glass layer, and an organic layer. The silicone layer is disposed adjacent to the first glass layer. The silicone layer includes a cured silicone composition. The second glass layer is disposed adjacent to the silicone layer, spaced from and substantially parallel to the first glass layer. The organic layer is disposed adjacent to the second glass layer, spaced from and substantially parallel to the silicone layer. The organic layer includes a cured organic composition.

The present invention also provides a method of making a composite article including a first glass layer and a polymeric layer disposed adjacent to the first glass layer. For the method, a dual-compartment chamber is provided. The chamber includes a first compartment and a second compartment separated by a polymeric separator. The separator is capable of manipulation within the chamber through pressure differentials between the compartments. The first glass layer is disposed in the first compartment. The silicone layer is disposed adjacent to the first glass layer. Pressure is applied to at least one of the silicone layer and the first glass layer with the polymeric separator.

Due to the presence of both the silicone layer and the organic layer in the composite article, the composite article exhibits a combination of excellent fire resistance and excellent impact strength. Further still, due to the presence of the silicone layer, the composite article maintains excellent structural integrity and resists collapse even after a breach is formed through the panes due to heat. As such, the composite articles of the subject invention may be suitable for load-bearing applications requiring excellent fire resistance, in addition to excellent impact strength, that are not possible with the composite articles of the prior art.

With regard to the method of making the composite article, use of the dual-compartment chamber, with the polymeric separator separating the compartments, enables application of pressure through the polymeric separator through merely varying pressure between the two compartments, which provides processing efficiency and consistent quality of the resulting composite article. The ability to manipulate the polymeric separator through pressure differentials between the compartments presents other processing advantages that are set forth in further detail below.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
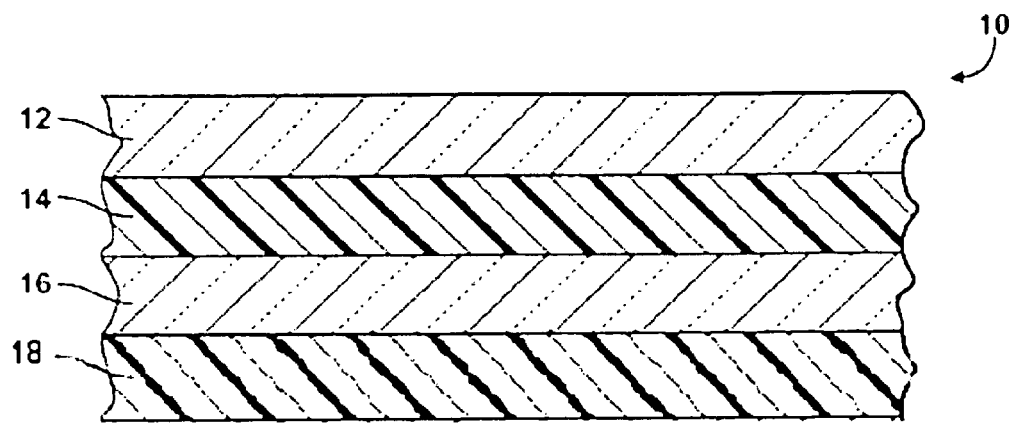
FIG. 1 is a cross-sectional side view of a composite article of the present invention.

Referring to the Figures, wherein like numerals indicate corresponding parts throughout the several views, a composite article is shown generally at 10 in FIG. 1. The composite article 10 has excellent impact strength and excellent fire resistance and is useful in the residential, commercial, and industrial construction industries, as well as the consumer appliance and automotive industries, for preventing fire, smoke, or extreme heat from propagating through buildings or to contain heat or fire within a space, such as in an oven. The composite article 10 of the present invention may also be suitable for applications requiring excellent impact strength, as will be appreciated with reference to the further description of the composite article 10 below.

The composite article 10 includes a first glass layer 12 formed from glass. The first glass layer 12 typically has high transparency of at least about 80%; however, it is to be appreciated that glass layers having less than about 80% transparency may also be suitable for purposes of the present invention. The first glass layer 12 provides wear and scratch-resistance that is typical of conventional windows.

Specific examples of suitable glass that may be used to form the first glass layer 12 include common silica-based glass or a carbon-based polymer. One specific example of a common silica-based glass is soda-lime-silica glass.

The first glass layer 12 may be formed through any method as known in the art for forming window layers. Typically, the first glass layer 12 is float glass, which is formed through a float process. The glass may be annealed, heat strengthened, or chemically or heat tempered by methods that are known in the art. It is to be appreciated that any type of glass formed through any known process is suitable for purposes of the present invention.

The first glass layer 12 typically has a thickness of from about 0.002 to about 1 inch, typically about 0.125 inch. The specific thickness of the first glass layer 12 is dependent on the specific application for which the composite article 10 is intended. For example, for load bearing applications or applications in which the composite article 10 can preferably withstand significant blunt force, the first glass layer 12 may have a greater thickness than it would for decorative applications. However, it is to be appreciated that the composite article 10 of the present invention is not limited to use in load bearing applications.

The composite article 10 further comprises a silicone layer 14. The silicone layer 14 provides the excellent fire resistance to the composite article 10, as described in further detail below. The silicone layer 14 is disposed adjacent to the first glass layer 12. In one embodiment, the silicone layer 14 is directly adhered to the first glass layer 12, i.e., the silicone layer 14 is in direct contact with the first glass layer 12. In another embodiment, an adhesive layer 20 is disposed between the silicone layer 14 and the first glass layer 12. The manners in which the silicone layer 14 and the first glass layer 12 are adhered together are described in further detail below.

The silicone layer 14 comprises a cured silicone composition. In one embodiment, the silicone layer 14 is further defined as a reinforced silicone layer 14 including a fiber reinforcement in addition to the cured silicone composition. When the silicone layer 14 includes the fiber reinforcement, the fiber reinforcement is typically impregnated with the cured silicone composition, i.e., the reinforced silicone layer 14 is a single layer including the fiber reinforcement and the cured silicone composition.

The silicone layer 14 typically has less than about 50 parts by weight carbon, more typically less than about 35 parts by weight carbon, based on the total weight of the silicone layer 14 in order to ensure that the silicone layer 14 will emit sufficiently low levels of smoke and toxic gases during burning.

In one embodiment, the cured silicone composition is further defined as a hydrosilylation-cured silicone composition. The hydrosilylation-cured silicone composition comprises the reaction product of (A) a silicone resin and (B) an organosilicon compound having an average of at least two silicon-bonded hydrogen atoms per molecule in an amount sufficient to cure the silicone resin, in the presence of (C) a catalytic amount of a hydrosilylation catalyst. Any hydrosilylation-cured silicone compositions that are known in the art may be suitable for purposes of the present invention; however, some hydrosilylation-cured silicone compositions are more suitable than others. More specifically, some silicone resins (A) are more suitable than others.

The silicone resin (A) typically has silicon-bonded alkenyl groups or silicon-bonded hydrogen atoms. The silicone resin (A) is typically a copolymer including $R^2SiO_{3/2}$ units, i.e., T units, and/or $SiO_{4/2}$ units, i.e., Q units, in combination with $R^1R^2_2SiO_{1/2}$ units, i.e., M units, and/or $R^2_2SiO_{2/2}$ units, i.e., D units, wherein $R^1$ is a $C_1$ to $C_{10}$ hydrocarbyl group or a $C_1$ to $C_{10}$ halogen-substituted hydrocarbyl group, both free of aliphatic unsaturation, and $R^2$ is $R^1$, an alkenyl group, or hydrogen. For example, the silicone resin (A) can be a DT resin, an MT resin, an MDT resin, a DTQ resin, and MTQ resin, and MDTQ resin, a DQ resin, an MQ resin, a DTQ resin, an MTQ resin, or an MDQ resin. As used herein, the term "free of aliphatic unsaturation" means the hydrocarbyl or halogen-substituted hydrocarbyl group does not contain an aliphatic carbon-carbon double bond or carbon-carbon triple bond.

The $C_1$ to $C_{10}$ hydrocarbyl group and $C_1$ to $C_{10}$ halogen-substituted hydrocarbyl group represented by $R^1$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different within the silicone resin (A), typically have from 2 to about 10 carbon atoms, more typically from 2 to 6 carbon atoms, and are exemplified by, but not limited to, vinyl, allyl, butenyl, hexenyl, and octenyl. In one embodiment, $R^2$ is predominantly the alkenyl group. In this embodiment, typically at least about 50 mol %, more typically at least about 65 mol %, most typically at least about 80 mol %, of the groups represented by $R^2$ in the silicone resin are alkenyl groups. As used herein, the mol % of alkenyl groups in $R^2$ is defined as a ratio of the number of moles of silicon-bonded alkenyl groups in the silicone resin to the total number of moles of the $R^2$ groups in the resin, multiplied by 100. In another embodiment, $R^2$ is predominantly hydrogen.

In this embodiment, typically at least about 50 mol %, more typically at least about 65 mol %, most typically at least about 80 mol %, of the groups represented by $R^2$ in the silicone resin are hydrogen. The mol % of hydrogen in $R^2$ is defined as a ratio of the number of moles of silicon-bonded hydrogen in the silicone resin to the total number of moles of the $R^2$ groups in the resin, multiplied by 100.

According to a first embodiment, the silicone resin (A) has the formula:

$$(R^1R^2{}_2SiO_{1/2})_w(R^2{}_2SiO_{2/2})_x(R^2SiO_{3/2})_y(SiO_{4/2})_z \quad (I)$$

wherein $R^1$ and $R^2$ are as described and exemplified above, w, x, y, and z are mole fractions. The silicone resin (A) represented by formula (I) has an average of at least two silicon-bonded alkenyl groups per molecule. More specifically, the subscript w typically has a value of from 0 to about 0.9, more typically from about 0.02 to about 0.75, most typically from about 0.05 to about 0.3. The subscript x typically has a value of from 0 to about 0.9, more typically from 0 to about 0.45, most typically from 0 to about 0.25. The subscript y typically has a value of from 0 to about 0.99, more typically from about 0.25 to about 0.8, most typically from about 0.5 to about 0.8. The subscript z typically has a value of from 0 to about 0.85, more typically from 0 to about 0.25, most typically from 0 to about 0.15. Also, the ratio $y+z/(w+x+y+z)$ is typically from about 0.1 to about 0.99, more typically from about 0.5 to about 0.95, most typically from about 0.65 to about 0.9. Further, the ratio $w+x/(w+x+y+z)$ is typically from about 0.01 to about 0.90, more typically from about 0.05 to about 0.5, most typically from about 0.1 to about 0.35.

When $R^2$ is predominantly the alkenyl group, specific examples of silicone resins (A) represented by formula (I) above include, but are not limited to, resins having the following formulae:

$(Vi_2MeSiO_{1/2})_{0.25}(PhSiO_{3/2})_{0.75}, (ViMe_2SiO_{1/2})_{0.25}(PhSiO_{3/2})_{0.75},$ $(ViMe_2SiO_{1/2})_{0.25}(MeSiO_{3/2})_{0.25}(PhSiO_{3/2})_{0.50},$ $(ViMe_2SiO_{1/2})_{0.15}(PhSiO_{3/2})_{0.75}(SiO_{4/2})_{0.1},$ and $(Vi_2MeSiO_{1/2})_{0.15}(ViMe_2SiO_{1/2})_{0.1}(PhSiO_{3/2})_{0.75},$ wherein Me is methyl, Vi is vinyl, Ph is phenyl, and the numerical subscripts outside the parenthesis denote mole fractions corresponding to either w, x, y, or z as described above for formula (I). The sequence of units in the preceding formulae is not to be viewed in any way as limiting to the scope of the invention.

When $R^2$ is predominantly hydrogen, specific examples of silicone resins (A) represented by formula (I) above include, but are not limited to, resins having the following formulae:

$(HMe_2SiO_{1/2})_{0.25}(PhSiO_{3/2})_{0.75}, (HMeSiO_{2/2})_{0.3}(PhSiO_{3/2})_{0.6}(MeSiO_{3/2})_{0.1},$ and $(Me_3SiO_{1/2})_{0.1}(H_2SiO_{2/2})_{0.1}(MeSiO_{3/2})_{0.4}(PhSiO_{3/2})_{0.4},$ wherein Me is methyl, Ph is phenyl, and the numerical subscripts outside the parenthesis denote mole fractions. The sequence of units in the preceding formulae is not to be viewed in any way as limiting to the scope of the invention.

The silicone resin (A) represented by formula (I) typically has a number-average molecular weight ($M_n$) of from about 500 to about 50,000, more typically from about 500 to about 10,000, most typically about 1,000 to about 3,000, where the molecular weight is determined by gel permeation chromatography employing a low angle laser light scattering detector, or a refractive index detector and silicone resin (MQ) standards.

The viscosity of the silicone resin (A) represented by formula (I) at 25° C. is typically from about 0.01 to about 100,000 Pa·s, more typically from about 0.1 to about 10,000 Pa·s, most typically from about 1 to about 100 Pa·s.

The silicone resin (A) represented by formula (I) typically includes less than about 10% (w/w), more typically less than about 5% (w/w), most typically less than about 2% (w/w), of silicon-bonded hydroxy groups, as determined by $^{29}$Si NMR.

Methods of preparing silicone resins (A) represented by formula (I) are well known in the art; many of these resins are commercially available. Silicone resins (A) represented by formula (I) are typically prepared by cohydrolyzing the appropriate mixture of chlorosilane precursors in an organic solvent, such as toluene. For example, a silicone resin (A) including $R^1R^2{}_2SiO_{1/2}$ units and $R^2SiO_{3/2}$ units can be prepared by cohydrolyzing a first compound having the formula $R^1R^2{}_2SiCl$ and a second compound having the formula $R^2SiCl_3$ in toluene, where $R^1$ and $R^2$ are as defined and exemplified above, to form aqueous hydrochloric acid and the silicone resin (A), which is a hydrolyzate of the first and second compounds. The aqueous hydrochloric acid and the silicone resin (A) are separated, the silicone resin (A) is washed with water to remove residual acid, and the silicone resin (A) is heated in the presence of a mild condensation catalyst to "body" the silicone resin (A) to a desired viscosity, as known in the art.

If desired, the silicone resin (A) can be further treated with a condensation catalyst in an organic solvent to reduce the content of silicon-bonded hydroxy groups. Alternatively, first or second compounds containing hydrolysable groups other than chloro, such —Br, —I, —OCH$_3$, —OC(O)CH$_3$, —N(CH$_3$)$_2$, NHCOCH$_3$, and —SCH$_3$, can be cohydrolyzed to form the silicone resin (A). The properties of the silicone resin (A) depend on the types of first and second compounds, the mole ratio of first and second compounds, the degree of condensation, and the processing conditions.

The organosilicon compound (B) has an average of at least two silicon-bonded hydrogen atoms per molecule, more typically at least three silicon-bonded hydrogen atoms per molecule. It is generally understood that cross-linking occurs when the sum of the average number of alkenyl groups per molecule in the silicone resin (A) and the average number of silicon-bonded hydrogen atoms per molecule in the organosilicon compound (B) is greater than four, and each molecule has two or more reactive groups. Prior to curing, the organosilicon compound (B) is present in an amount sufficient to cure the silicone resin (A).

The organosilicon compound (B) may be further defined as an organohydrogensilane, an organohydrogensiloxane, or a combination thereof. The structure of the organosilicon compound (B) can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, more typically from 3 to 10 silicon atoms, most typically from 3 to 4 silicon atoms.

The organohydrogensilane can be a monosilane, disilane, trisilane, or polysilane. When $R^2$ is predominantly the alkenyl group, specific examples of organohydrogensilanes that are suitable for purposes of the present invention include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene. When $R^2$ is predominantly hydrogen, specific examples of organohydrogensilanes that are suitable for purposes of the present invention include, but are not limited to, silanes having the following formulae:

$Pr_2SiH_2, PhSiH_3, MeSiH_3, PhMeSiH_2, Ph_2SiH_2$, and $(HMeSiO)_4$, wherein Pr is propyl, Me is methyl, and Ph is phenyl.

The organohydrogensilane can also have the formula:

$$HR^1_2Si—R^3—SiR^1_2H \qquad (II)$$

wherein $R^1$ is as defined and exemplified above and $R^3$ is a hydrocarbylene group free of aliphatic unsaturation having a formula selected from the following structures:

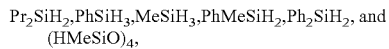

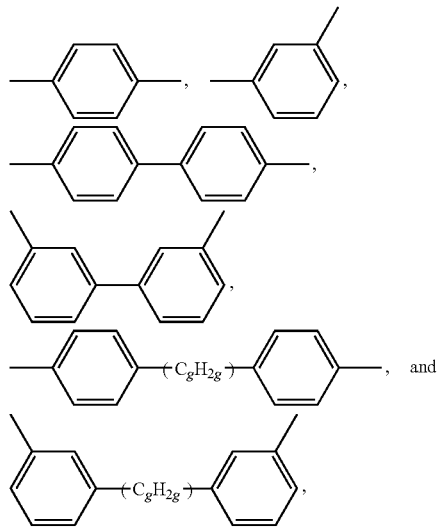

wherein g is from 1 to 6.

Specific examples of organohydrogensilanes having the formula (II), wherein $R^1$ and $R^3$ are as described and exemplified above include, but are not limited to, organohydrogensilanes having a formula selected from the following structures:

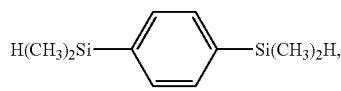

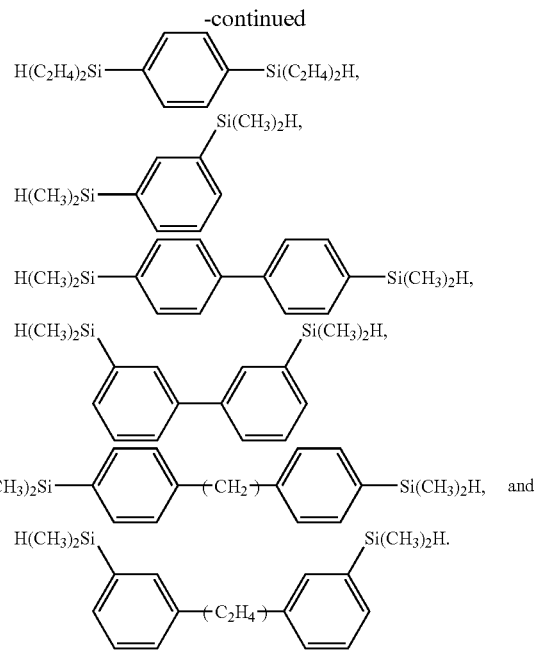

Methods of preparing the organohydrogensilanes are known in the art. For example, organohydrogensilanes can be prepared by reaction of Grignard reagents with alkyl or aryl halides. In particular, organohydrogensilanes having the formula $HR^1_2Si—R^3—SiR^1_2H$ can be prepared by treating an aryl dihalide having the formula $R^3X_2$ with magnesium in ether to produce the corresponding Grignard reagent and then treating the Grignard reagent with a chlorosilane having the formula $HR^1_2SiCl$, where $R^1$ and $R^3$ are as described and exemplified above.

The organohydrogensiloxane can be a disiloxane, trisiloxane, or polysiloxane. Examples of organosiloxanes suitable for use as the organosilicon compound (B) when $R^2$ is predominantly hydrogen include, but are not limited to, siloxanes having the following formulae:

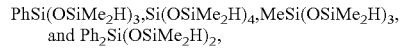

wherein Me is methyl, and Ph is phenyl.

Specific examples of organohydrogensiloxanes that are suitable for purposes of the present invention when $R^2$ is predominantly alkenyl group including, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a resin including $HMe_2SiO_{1/2}$ units, $Me_3SiO_{1/2}$ units, and $SiO_{4/2}$ units, wherein Me is methyl. The organohydrogensiloxane can also be an organohydrogenpolysiloxane resin. The organohydrogenpolysiloxane resin is typically a copolymer including $R^4SiO_{3/2}$ units, i.e., T units, and/or $SiO_{4/2}$ units, i.e., Q units, in combination with $R^1R^4_2SiO_{1/2}$ units, i.e., M units, and/or $R^4_2SiO_{2/2}$ units, i.e., D units, wherein $R^1$ is as described and exemplified above. For example, the organohydrogenpolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

The group represented by $R^4$ is either $R^1$ or an organosilylalkyl group having at least one silicon-bonded hydrogen atom. Examples of organosilylalkyl groups represented by $R^4$ include, but are not limited to, groups having a formula selected from the following structures:

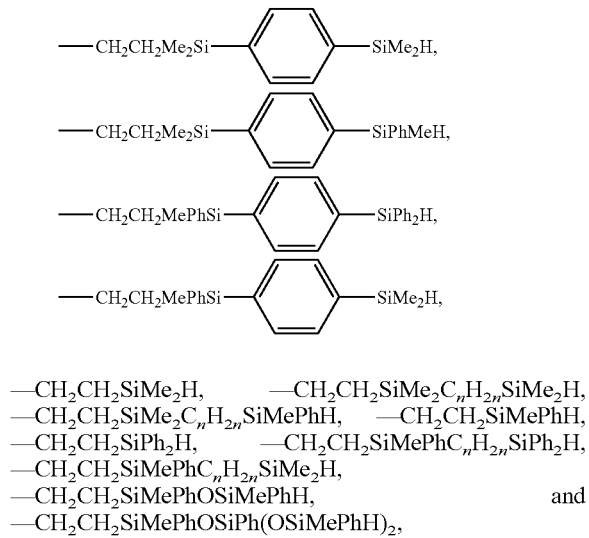

—$CH_2CH_2SiMe_2H$, —$CH_2CH_2SiMe_2C_nH_{2n}SiMe_2H$,
—$CH_2CH_2SiMe_2C_nH_{2n}SiMePhH$, —$CH_2CH_2SiMePhH$,
—$CH_2CH_2SiPh_2H$, —$CH_2CH_2SiMePhC_nH_{2n}SiPh_2H$,
—$CH_2CH_2SiMePhC_nH_{2n}SiMe_2H$,
—$CH_2CH_2SiMePhOSiMePhH$, and
—$CH_2CH_2SiMePhOSiPh(OSiMePhH)_2$, wherein Me is methyl, Ph is phenyl, and the subscript n has a value of from 2 to 10. Typically, at least about 50 mol %, more typically at least about 65 mol %, most typically at least about 80 mol % of the groups represented by $R^4$ in the organohydrogenpolysiloxane resin are organosilylalkyl groups having at least one silicon-bonded hydrogen atom. As used herein, the mol % of organosilylalkyl groups in $R^4$ is defined as a ratio of the number of moles of silicon-bonded organosilylalkyl groups in the silicone resin (A) to the total number of moles of the $R^4$ groups in the resin, multiplied by 100.

The organohydrogenpolysiloxane resin typically has the formula:

$$(R^1R^4_2SiO_{1/2})_w(R^4_2SiO_{2/2})_x(R^4SiO_{3/2})_y(SiO_{4/2})_z \quad (III)$$

wherein $R^1$, $R^4$, w, x, y, and z are each as defined and exemplified above.

Specific examples of organohydrogenpolysiloxane resins represent by formula (III) above include, but are not limited to, resins having the following formulae:

$((HMe_2SiC_6H_4SiMe_2CH_2CH_2)_2MeSiO_{1/2})_{0.12}$
$(PhSiO_{3/2})_{0.88}$, $((HMe_2SiC_6H_4SiMe_2CH_2CH_2)_2MeSiO_{1/2})_{0.17}$
$(PhSiO_{3/2})_{0.83}$, $((HMe_2SiC_6H_4SiMe_2CH_2CH_2)_2MeSiO_{1/2})_{0.17}$
$(MeSiO_{3/2})_{0.17}(PhSiO_{3/2})_{0.66}$, $((HMe_2SiC_6H_4SiMe_2CH_2CH_2)_2MeSiO_{1/2})_{0.15}$
$(PhSiO_{3/2})_{0.75}(SiO_{4/2})_{0.10}$, and $((HMe_2SiC_6H_4SiMe_2CH_2CH_2)_2MeSiO_{1/2})_{0.08}$
$((HMe_2SiC_6H_4SiMe_2CH_2CH_2)$ $Me_2SiO_{1/2})_{0.06}(PhSiO_{3/2})_{0.86}$, wherein Me is methyl, Ph is phenyl, $C_6H_4$ denotes a paraphenylene group, and the numerical subscripts outside the parenthesis denote mole fractions. The sequence of units in the preceding formulae is not to be viewed in any way as limiting to the scope of the invention.

Specific examples of organohydrogenpolysiloxane resins include, but are not limited to, resins having the following formulae:

$((HMe_2SiC_6H_4SiMe_2CH_2CH_2)_2MeSiO_{1/2})_{0.12}$
$(PhSiO_{3/2})_{0.88}$, $((HMe_2SiC_6H_4SiMe_2CH_2CH_2)_2MeSiO_{1/2})_{0.17}$
$(PhSiO_{3/2})_{0.83}$, $((HMe_2SiC_6H_4SiMe_2CH_2CH_2)_2MeSiO_{1/2})_{0.17}$
$(MeSiO_{3/2})_{0.17}(PhSiO_{3/2})_{0.66}$, $((HMe_2SiC_6H_4SiMe_2CH_2CH_2)_2MeSiO_{1/2})_{0.15}$
$(PhSiO_{3/2})_{0.75}(SiO_{4/2})_{0.10}$, and $((HMe_2SiC_6H_4SiMe_2CH_2CH_2)_2MeSiO_{1/2})_{0.08}$
$((HMe_2SiC_6H_4SiMe_2CH_2CH_2)$ $Me_2SiO_{1/2})_{0.06}(PhSiO_{3/2})_{0.86}$, where Me is methyl, Ph is phenyl, $C_6H_4$ denotes a paraphenylene group, and the numerical subscripts outside the parenthesis denote mole fractions. The sequence of units in the preceding formulae is not to be viewed in any way as limiting to the scope of the invention.

The organohydrogenpolysiloxane resin having the formula (III) can be prepared by reacting a reaction mixture including (a) a silicone resin having the formula $(R^1R^2_2SiO_{1/2})_w$ $(R^2_2SiO_{2/2})_x$ $(R^2SiO_{3/2})_y(SiO_{4/2})_z$ represented by formula (I) above and an organosilicon compound (b) having an average of from two to four silicon-bonded hydrogen atoms per molecule and a molecular weight less than about 1,000, in the presence of (c) a hydrosilylation catalyst and, optionally, (d) an organic solvent, wherein $R^1$, $R^2$, w, x, y, and z are each as defined and exemplified above, provided the silicone resin (a) has an average of at least two silicon-bonded alkenyl groups per molecule, and the mole ratio of silicon-bonded hydrogen atoms in (b) to alkenyl groups in (a) is from about 1.5 to about 5. Silicone resin (a) can be the same as or different than the specific silicone resin used as component (A) to form the hydrosilylation-cured silicone composition.

As set forth above, organosilicon compound (b) has an average of from two to four silicon-bonded hydrogen atoms per molecule. Alternatively, the organosilicon compound (b) has an average of from two to three silicon-bonded hydrogen atoms per molecule. As also set forth above, the organosilicon compound (b) typically has a molecular weight less than about 1,000, more typically less than about 750, most typically less than about 500. The organosilicon compound (b) further includes silicon-bonded organic groups that may be selected from the group of hydrocarbyl groups and halogen-substituted hydrocarbyl groups, both free of aliphatic unsaturation, which are as described and exemplified above for $R^1$.

Organosilicon compound (b) can be an organohydrogensilane or an organohydrogensiloxane, each of which are defined and exemplified in detail above. Organosilicon compound (b) can further be a single organosilicon compound or a mixture comprising two or more different organosilicon compounds, each as described above. For example, organosilicon compound (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. The mole ratio of silicon-bonded hydrogen atoms in organosilicon compound (b) to alkenyl groups in silicone resin (a) is typically from about 1.5 to about 5, more typically from 1.75 to about 3, most typically from about 2 to about 2.5.

Hydrosilylation catalyst (c) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (c) include the complexes of chloroplatinic acid and certain vinyl-containing organosiloxanes disclosed by Willing in U.S. Pat. No. 3,419,593, which is hereby incorporated by reference. A catalyst of this type is the reaction product of chloroplatinic acid and 1,3-diethenyl-1,1,3,3-tetramethyldisiloxane.

The hydrosilylation catalyst (c) can also be a supported hydrosilylation catalyst comprising a solid support having a platinum group metal on the surface thereof. A supported catalyst can be conveniently separated from the organohydrogenpolysiloxane resin represented by formula (III), for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

The concentration of hydrosilylation catalyst (c) is sufficient to catalyze the addition reaction of silicone resin (a) with organosilicon compound (b). Typically, the concentration of hydrosilylation catalyst (c) is sufficient to provide from about 0.1 to about 1000 ppm of a platinum group metal, more typically from about 1 to about 500 ppm of a platinum group metal, most typically from about 5 to about 150 ppm of a platinum group metal, based on the combined weight of silicone resin (a) and organosilicon compound (b). The rate of reaction is very slow below 0.1 ppm of platinum group metal. The use of more than about 1000 ppm of platinum group metal results in no appreciable increase in reaction rate, and is therefore uneconomical.

Organic solvent (d) is at least one organic solvent. The organic solvent (d) can be any aprotic or dipolar aprotic organic solvent that does not react with silicone resin (a), organosilicon compound (b), or the resulting organohydrogenpolysiloxane resin under the conditions of the present method, and is miscible with components (a), (b), and the organohydrogenpolysiloxane resin.

Examples of organic solvents (d) that are suitable for purposes of the present invention include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (d) can be a single organic solvent or a mixture comprising two or more different organic solvents, each as described above. The concentration of organic solvent (d) is typically from 0 to about 99% (w/w), more typically from about 30 to about 80% (w/w), most typically from about 45 to about 60% (w/w), based on the total weight of the reaction mixture.

The reaction to form the organohydrogenpolysiloxane resin represented by formula (III) can be carried out in any standard reactor suitable for hydrosilylation reactions. Suitable reactors include glass and Teflon-lined glass reactors. Typically, the reactor is equipped with a means of agitation, such as stirring. Also, typically, the reaction is carried out in an inert atmosphere, such as nitrogen or argon, in the absence of moisture.

The silicone resin (a), organosilicon compound (b), hydrosilylation catalyst (c), and, optionally, organic solvent (d), can be combined in any order. Typically, organosilicon compound (b) and hydrosilylation catalyst (c) are combined before the introduction of the silicone resin (a) and, optionally, organic solvent (d). The reaction is typically carried out at a temperature of from 0 to about 150° C., more typically from room temperature (~23±2° C.) to about 115° C. When the temperature is less than 0° C., the rate of reaction is typically very slow. The reaction time depends on several factors, such as the structures of the silicone resin (a) and the organosilicon compound (b), and the temperature. The time of reaction is typically from about 1 to about 24 h at a temperature of from room temperature (~23±2° C.) to about 150° C.

The optimum reaction time can be determined by routine experimentation. The organohydrogenpolysiloxane resin represented by formula (IH) can be used without isolation or purification or the organohydrogenpolysiloxane resin can be separated from most of the organic solvent (d) by conventional methods of evaporation. For example, the reaction mixture can be heated under reduced pressure.

Moreover, when the hydrosilylation catalyst (c) is a supported catalyst, as described above, the organohydrogenpolysiloxane resin can be readily separated from the hydrosilylation catalyst (c) by filtering the reaction mixture. However, the hydrosilylation catalyst (c) may remain mixed with the organohydrogenpolysiloxane resin and be used as hydrosilylation catalyst (C).

The organosilicon compound (B) can be a single organosilicon compound or a mixture comprising two or more different organosilicon compounds, each as described above. For example, the organosilicon compound (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. In particular, the organosilicon compound (B) can be a mixture comprising the organohydrogenpolysiloxane resin having the formula (III) in an amount of at least about 0.5% (w/w), more typically at least about 50% (w/w), most typically at least about 75% (w/w), based on the total weight of the organosilicon compound (B), with the organosilicon compound (B) further comprising an organohydrogensilane and/or organohydrogensiloxane, the latter different from the organohydrogenpolysiloxane resin.

The concentration of organosilicon compound (B) is sufficient to cure (cross-link) the silicone resin (A). The exact amount of organosilicon compound (B) depends on the desired extent of cure. The concentration of organosilicon compound (B) is typically sufficient to provide from about 0.4 to about 2 moles of silicon-bonded hydrogen atoms, more typically from about 0.8 to about 1.5 moles of silicon-bonded hydrogen atoms, most typically from about 0.9 to about 1.1 moles of silicon-bonded hydrogen atoms, per mole of alkenyl groups in silicone resin (A).

Hydrosilylation catalyst (C) includes at least one hydrosilylation catalyst that promotes the reaction between silicone resin (A) and organosilicon compound (B). In one embodiment, the hydrosilylation catalyst (C) may be the same as the hydrosilylation catalyst (c) described above for producing the organohydrogenpolysiloxane resin. In addition, the hydrosilylation catalyst (C) can also be a microencapsulated platinum group metal-containing catalyst comprising a platinum group metal encapsulated in a thermoplastic resin. Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, complexing ligand, and thermoplastic resin.

In another embodiment, the hydrosilylation catalyst (C) may be at least one photoactivated hydrosilylation catalyst. The photoactivated hydrosilylation catalyst can be any hydrosilylation catalyst capable of catalyzing the hydrosilylation of the silicone resin (A) and the organosilicon compound (B) upon exposure to radiation having a wavelength of from about 150 to about 800 nm. The photoactivated hydrosilylation catalyst can be any of the well-known hydrosilylation catalysts comprising a platinum group metal or a compound containing a platinum group metal. The platinum group metals include platinum, rhodium, ruthenium, palladium, osmium and iridium. Typically, the platinum group metal is platinum, based on its high activity in hydrosilylation reactions. The suitability of particular photoactivated hydrosilylation catalyst for use in the silicone composition of the present invention can be readily determined by routine experimentation.

Specific examples of photoactivated hydrosilylation catalysts suitable for purposes of the present invention include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p\text{-}CN\text{---}C_6H_4NNNOC_6H_{11}]_4$, $Pt[p\text{-}H_3COC_6H_4NNNOC_6H_{11}]_4$, $Pt[p\text{-}CH_3(CH_2)_x\text{---}C_6H_4NNNOCH_3]_4$, 1,5-cyclooctadiene. $Pt[p\text{-}CN\text{---}C_6H_4NNNOC_6H_{11}]_2$, 1,5-cyclooctadiene. $Pt[p\text{-}CH_3O\text{---}C_6H_4NNNOCH_3]_2$, $[(C_6H_5)_3P]_3Rh[p\text{-}CN\text{---}C_6H_4NNNOC_6H_{11}]$, and $Pd[p\text{-}CH_3(CH_2)_x\text{---}C_6H_4NNNOCH_3]_2$, where x is 1, 3, 5, 11, or 17; (η-diolefin)(σ-aryl)platinum complexes, such as (η⁴-1,5-cyclooctadienyl)diphenylplatinum, η⁴-1,3,5,7-cyclooctatetraenyl)diphenylplatinum, (η⁴-2,5-norboradienyl)diphenylplatinum, (η⁴-1,5-cyclooctadienyl)bis-(4-dimethylaminophenyl)platinum, (η⁴-1,5-cyclooctadienyl)bis-(4-acetylphenyl)platinum, and (η⁴-1,5-cyclooctadienyl)bis-(4-trifluormethylphenyl)platinum. Typically, the photoactivated hydrosilylation catalyst is a Pt(II) β-diketonate complex and more typically the catalyst is platinum(II) bis(2,4-pentanedioate). The hydrosilylation catalyst (C) can be a single photoactivated hydrosilylation catalyst or a mixture comprising two or more different photoactivated hydrosilylation catalysts.

Methods of preparing photoactivated hydrosilylation catalysts are well known in the art. For example, methods of preparing platinum(II) β-diketonates are reported by Guo et al. (Chemistry of Materials, 1998, 10, 531-536). Methods of preparing (n-cyclopentadienyl)-trialkylplatinum complexes and are disclosed in U.S. Pat. No. 4,510,094. Methods of preparing triazene oxide-transition metal complexes are disclosed in U.S. Pat. No. 5,496,961. And, methods of preparing (η-diolefin)(σ-aryl) platinum complexes are taught in U.S. Pat. No. 4,530,879.

The concentration of the hydrosilylation catalyst (C) is sufficient to catalyze the addition reaction of the silicone resin (A) and the organosilicon compound (B). The concentration of the hydrosilylation catalyst (C) is sufficient to provide typically from about 0.1 to about 1000 ppm of platinum group metal, more typically from about 0.5 to about 100 ppm of platinum group metal, most typically from about 1 to about 25 ppm of platinum group metal, based on the combined weight of the silicone resin (A) and the organosilicon compound (B).

Optionally, the hydrosilylation-cured silicone composition further includes (D) a silicone rubber having a formula selected from the group of:

$$R^1R^2_2SiO(R^2_2SiO)_aSiR^2_2R^1; \quad (i)$$

and $$R^5R^1_2SiO(R^1R^5SiO)_bSiR^1_2R^5; \quad (ii)$$

wherein $R^1$ and $R^2$ are as defined and exemplified above, $R^5$ is $R^1$ or —H, subscripts a and b each have a value of from 1 to 4, from 2 to 4 or from 2 to 3, and w, x, y, and z are also as defined and exemplified above, provided the silicone resin and the silicone rubber (D)(i) each have an average of at least two silicon-bonded alkenyl groups per molecule, the silicone rubber (D)(ii) has an average of at least two silicon-bonded hydrogen atoms per molecule, and the mole ratio of silicon-bonded alkenyl groups or silicon-bonded hydrogen atoms in the silicone rubber (D) to silicon-bonded alkenyl groups in the silicone resin (A) is from about 0.01 to about 0.5.

Specific examples of silicone rubbers suitable for use as component (D)(i) include, but are not limited to, silicone rubbers having the following formulae:

$$ViMe_2SiO(Me_2SiO)_aSiMe_2Vi, ViMe_2SiO(Ph_2SiO)_a SiMe_2Vi, \text{ and}$$

$$ViMe_2SiO(PhMeSiO)_aSiMe_2Vi,$$

wherein Me is methyl, Ph is phenyl, Vi is vinyl, and the subscript a has a value of from 1 to 4. Silicone rubber (D)(i) can be a single silicone rubber or a mixture comprising two or more different silicone rubbers that each satisfy the formula for (D)(i).

Specific examples of silicone rubbers suitable for use as silicone rubber (D)(ii) include, but are not limited to, silicone rubbers having the following formulae:

$$HMe_2SiO(Me_2SiO)_bSiMe_2H, HMe_2SiO(Ph_2SiO)_b SiMe_2H, HMe_2SiO(PhMeSiO)_bSiMe_2H, \text{ and} HMe_2SiO(Ph_2SiO)_2(Me_2SiO)_2SiMe_2H,$$

wherein Me is methyl, Ph is phenyl, and the subscript b has a value of from 1 to 4. Component (D)(ii) can be a single silicone rubber or a mixture comprising two or more different silicone rubbers that each satisfy the formula for (D)(ii).

The mole ratio of silicon-bonded alkenyl groups or silicon-bonded hydrogen atoms in the silicone rubber (D) to silicon-bonded alkenyl groups in the silicone resin (A) is typically from about 0.01 to about 0.5, more typically from about 0.05 to about 0.4, most typically from about 0.1 to about 0.3.

When the silicone rubber (D) is (D)(i), the concentration of the organosilicon compound (B) is such that the ratio of the number of moles of silicon-bonded hydrogen atoms in the organosilicon compound (B) to the sum of the number of moles of silicon-bonded alkenyl groups in the silicone resin (A) and the silicone rubber (D)(i) is typically from about 0.4 to about 2, more typically from about 0.8 to about 1.5, most typically from about 0.9 to about 1.1. Furthermore, when the silicone rubber (D) is (D)(ii), the concentration of the organosilicon compound (B) is such that the ratio of the sum of the number of moles of silicon-bonded hydrogen atoms in the organosilicon compound (B) and the silicone rubber (D)(ii) to the number of moles of silicon-bonded alkenyl groups in the silicone resin (A) is typically from about 0.4 to about 2, more typically from about 0.8 to about 1.5, most typically from about 0.9 to about 1.1.

Methods of preparing silicone rubbers containing silicon-bonded alkenyl groups or silicon-bonded hydrogen atoms are well known in the art; many of these compounds are commercially available.

In another embodiment of the present invention, the hydrosilylation-cured silicone composition comprises the reaction product of (A') a rubber-modified silicone resin and the organosilicon compound (B), in the presence of (C) the catalytic amount of the hydrosilylation catalyst. The rubber-modified silicone resin (A') may be prepared by reacting the silicone resin (A) and a silicone rubber (D)(iii) having the following formulae:

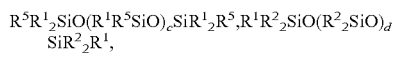

wherein $R^1$ and $R^5$ are as defined and exemplified above and c and d each have a value of from about 4 to about 1000, more typically from about 10 to about 500, most typically from about 10 to about 50, in the presence of the hydrosilylation catalyst (c) and, optionally, an organic solvent, provided the silicone resin (A) has an average of at least two silicon-bonded alkenyl groups per molecule, the silicone rubber (D)(iii) has an average of at least two silicon-bonded hydrogen atoms per molecule, and the mole ratio of silicon-bonded hydrogen atoms in the silicone rubber (D)(iii) to silicon-bonded alkenyl groups in silicone resin (A) is from about 0.01 to about 0.5. When organic solvent is present, the rubber-modified silicone resin (A') is miscible in the organic solvent and does not form a precipitate or suspension.

The silicone resin (A), silicone rubber (D)(iii), hydrosilylation catalyst (c), and organic solvent can be combined in any order. Typically, the silicone resin (A), silicone rubber (D)(iii), and organic solvent are combined before the introduction of the hydrosilylation catalyst (c).

The reaction is typically carried out at a temperature of from room temperature (~23±2° C.) to about 150° C., more typically from room temperature to about 100° C. The reaction time depends on several factors, including the structures of the silicone resin (A) and the silicone rubber (D)(iii) and the temperature. The components are typically allowed to react for a period of time sufficient to complete the hydrosilylation reaction. This means the components are typically allowed to react until at least about 95 mol %, more typically at least about 98 mol %, most typically at least about 99 mol %, of the silicon-bonded hydrogen atoms originally present in the silicone rubber (D)(iii) have been consumed in the hydrosilylation reaction, as determined by FTIR spectrometry. The time of reaction is typically from about 0.5 to about 24 h at a temperature of from room temperature (~23±2° C.) to about 100° C.

The optimum reaction time can be determined by routine experimentation. The mole ratio of silicon-bonded hydrogen atoms in the silicone rubber (D)(iii) to silicon-bonded alkenyl groups in the silicone resin (A) is typically from about 0.01 to about 0.5, more typically from about 0.05 to about 0.4, most typically from about 0.1 to about 0.3.

The concentration of the hydrosilylation catalyst (c) is sufficient to catalyze the addition reaction of the silicone resin (A) with the silicone rubber (D)(iii). Typically, the concentration of the hydrosilylation catalyst (c) is sufficient to provide from about 0.1 to about 1000 ppm of a platinum group metal, based on the combined weight of the resin and the rubber.

The concentration of the organic solvent is typically from 0 to about 95% (w/w), more typically from about 10 to about 75% (w/w), most typically from about 40 to about 60% (w/w), based on the total weight of the reaction mixture.

The rubber-modified silicone resin (A') can be used without isolation or purification or the rubber-modified silicone resin (A') can be separated from most of the solvent by conventional methods of evaporation. For example, the reaction mixture can be heated under reduced pressure. Moreover, when the hydrosilylation catalyst (c) is a supported catalyst, described above, the rubber-modified silicone resin (A') can be readily separated from the hydrosilylation catalyst (c) by filtering the reaction mixture. However, when the rubber-modified silicone resin (A') is not separated from the hydrosilylation catalyst (c) used to prepare the rubber-modified silicone resin (A'), the hydrosilylation catalyst (c) may be used as the hydrosilylation catalyst (C).

The hydrosilylation-cured silicone composition of the present invention can comprise additional ingredients, as known in the art. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; anti-oxidants; heat stabilizers; UV stabilizers; flame retardants; flow control additives; and diluents, such as organic solvents and reactive diluents.

As an alternative to the hydrosilylation-cured silicone composition, condensation-cured silicone compositions are also suitable for the silicone composition of the present invention.

The condensation-cured silicone composition typically includes the reaction product of a silicone resin (A") having silicon-bonded hydroxy or hydrolysable groups and, optionally, a cross-linking agent (B') having silicon-bonded hydrolysable groups, and optionally a condensation catalyst (C'). The silicone resin (A") is typically a copolymer containing T and/or Q siloxane units in combination with M and/or D siloxane units.

The condensation-cured silicone composition may be any condensation-cured silicone composition as known in the art. However, certain condensation-cured silicone compositions are particularly suitable for purposes of the present invention. According to one embodiment, the silicone resin (A") has the formula:

wherein $R^1$ is as defined and exemplified above, $R^6$ is $R^1$, —H, —OH, or a hydrolysable group, and w' is from 0 to about 0.8, more typically from about 0.02 to about 0.75, and most typically from about 0.05 to about 0.3, x' is from 0 to about 0.95, more typically from about 0.05 to about 0.8, and most typically from about 0.1 to about 0.3, y' is from 0 to about 1, more typically from about 0.25 to about 0.8, and most typically from about 0.5 to about 0.8, and z' is from 0 to about 0.99, more typically from about 0.2 to about 0.8, and most typically from about 0.4 to about 0.6, and the silicone resin (A") has an average of at least two silicon-bonded hydrogen atoms, hydroxy groups, or hydrolysable groups per molecule. As used herein the term "hydrolysable group" means the silicon-bonded group reacts with water in the absence of a catalyst at any temperature from room temperature (~23±2° C.) to about 100° C. within several minutes, for example thirty minutes, to form a silanol (Si—OH) group. Examples of hydrolysable groups represented by $R^6$ include, but are not limited to, —Cl, —Br, —OR$^7$, —OCH$_2$CH$_2$OR$^7$, CH$_3$C(=O)O—, Et(Me)C=N—O—, CH$_3$C(=O)N(CH$_3$)—, and —ONH$_2$, wherein $R^7$ is $C_1$ to $C_8$ hydrocarbyl or $C_1$ to $C_8$ halogen-substituted hydrocarbyl.

The hydrocarbyl and halogen-substituted hydrocarbyl groups represented by $R^7$ typically have from 1 to 8 carbon atoms, more typically from 3 to 6 carbon atoms. Acyclic hydrocarbyl and halogen-substituted hydrocarbyl groups containing at least 3 carbon atoms can have a branched or unbranched structure. Examples of hydrocarbyl groups represented by $R^7$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups represented by $R^7$ include, but are not limited to, 3,3,3-trifluoropropyl, 3-chloropropyl, chlorophenyl, and dichlorophenyl.

Typically, at least about 5 mol %, more typically at least about 15 mol %, most typically at least about 30 mol % of the groups $R^6$ in the silicone resin are hydrogen, hydroxy, or a hydrolysable group. As used herein, the mol % of groups in $R^6$ is defined as a ratio of the number of moles of silicon-bonded groups in the silicone resin (A") to the total number of moles of the $R^6$ groups in the silicone resin (A"), multiplied by 100.

Specific examples of cured silicone resins formed from silicone resin (A") include, but are not limited to, cured silicone resins having the following formulae:

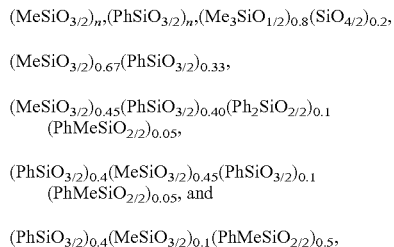

wherein Me is methyl, Ph is phenyl, the numerical subscripts outside the parenthesis denote mole fractions, and the subscript n has a value such that the silicone resin has a number-average molecular weight of from about 500 to about 50,000. The sequence of units in the preceding formulae is not to be viewed in any way as limiting to the scope of the invention.

As set forth above, the silicone resin (A") represented by formula (IV) typically has a number-average molecular weight ($M_n$) of from about 500 to about 50,000. Alternatively, the silicone resin (A") may have a $M_n$ of at least about 300, more typically about 1,000 to about 3,000, where the molecular weight is determined by gel permeation chromatography employing a low angle laser light scattering detector, or a refractive index detector and silicone resin (MQ) standards.

The viscosity of the silicone resin (A") at 25° C. is typically from about 0.01 Pa·s to solid, more typically from about 0.1 to about 100,000 Pa·s, most typically from about 1 to about 1,000 Pa·s.

Methods of preparing silicone resins (A") represented by formula (IV) are well known in the art; many of these resins are commercially available. Silicone resins (A") represented by formula (IV) are typically prepared by cohydrolyzing the appropriate mixture of chlorosilane precursors in an organic solvent, such as toluene. For example, a silicone resin including $R^1R^6{}_2SiO_{1/2}$ units and $R^6SiO_{3/2}$ units can be prepared by cohydrolyzing a first compound having the formula $R^1R^6{}_2SiCl$ and a second compound having the formula $R^6SiCl_3$ in toluene, where $R^1$ and $R^6$ are as defined and exemplified above. The cohydrolyzing process is described above in terms of the hydrosilylation-cured silicone composition. The cohydrolyzed reactants can be further "bodied" to a desired extent to control the amount of crosslinkable groups and viscosity.

The Q units in formula (IV) can be in the form of discrete particles in the silicone resin (A"). The particle size is typically from about 1 nm to about 20 μm. Examples of these particles include, but not limited to, silica ($SiO_{4/2}$) particles of about 15 nm in diameter.

The condensation cured silicone composition can further contain inorganic fillers such as silica, alumina, calcium carbonate, and mica.

In another embodiment, the condensation-cured silicone composition comprises the reaction product of a rubber-modified silicone resin (A''') and the other optional components. The rubber-modified silicone resin (A''') may be prepared by reacting an organosilicon compound selected from (i) a silicone resin having the formula $(R^1R^6{}_2SiO_{1/2})_w$ $(R^6{}_2SiO_{2/2})_x(R^6SiO_{3/2})_y(SiO_{4/2})_z$ and (ii) hydrolysable precursors of (i), and (iii) a silicone rubber having the formula $R^8{}_3SiO(R^1R^8SiO)_mSiR^8{}_3$ in the presence of water, (iv) a condensation catalyst, and (v) an organic solvent, wherein $R^1$ and $R^6$ are as defined and exemplified above, $R^8$ is $R^1$ or a hydrolysable group, m is from about 2 to about 1,000, more typically from about 4 to about 500, most typically from about 8 to about 400, and w, x, y, and z are as defined and exemplified above, and silicone resin (i) has an average of at least two silicon-bonded hydroxy or hydrolysable groups per molecule, the silicone rubber (iii) has an average of at least two silicon-bonded hydrolysable groups per molecule, and the mole ratio of silicon-bonded hydrolysable groups in the silicone rubber (iii) to silicon-bonded hydroxy or hydrolysable groups in the silicone resin (i) is from about 0.01 to about 1.5, more typically from about 0.05 to about 0.8, most typically from about 0.2 to about 0.5.

Typically at least about 5 mol %, more typically at least about 15 mol %, most typically at least about 30 mol % of the groups $R^6$ in the silicone resin (i) are hydroxy or hydrolysable groups.

The silicone resin (i) typically has a number-average molecular weight ($M_n$) of at least about 300, more typically from about 500 to about 10,000, most typically about 1,000 to about 3,000, where the molecular weight is determined by gel permeation chromatography employing a low angle laser light scattering detector, or a refractive index detector and silicone resin (MQ) standards.

Specific examples of cured silicone resins formed from silicone resin (i) include, but are not limited to, cured silicone resins having the following formulae:

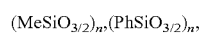

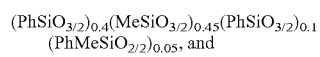

where Me is methyl, Ph is phenyl, the numerical subscripts outside the parenthesis denote mole fractions, and the subscript n has a value such that the silicone resin has a number-average molecular weight of from about 500 to about 50,000. The sequence of units in the preceding formulae is not to be viewed in any way as limiting to the scope of the invention. Silicone resin (i) can be a single silicone resin or a mixture comprising two or more different silicone resins, each having the specified formula.

As used herein, the term "hydrolysable precursors" refers to silanes having hydrolysable groups that are suitable for use as starting materials (precursors) for preparation of the silicone resin (i). The hydrolysable precursors (ii) can be represented by the formulae $R^1R^8{}_2SiX$, $R^8{}_2SiX_2$, $R^8SiX_3$, and $SiX_4$, wherein $R^1$, $R^8$, and X are as defined and exemplified above.

Specific examples of hydrolysable precursors (ii) include, but are not limited to, silanes having the formulae:

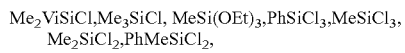

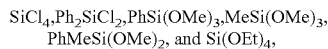

wherein Me is methyl, Et is ethyl, and Ph is phenyl.

Specific examples of silicone rubbers (iii) include, but are not limited to, silicone rubbers having the following formulae:

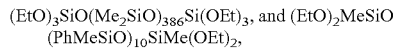

wherein Me is methyl and Et is ethyl.

The reaction is typically carried out at a temperature of from room temperature (~23±2° C.) to about 180° C., more typically from room temperature to about 100° C.

The reaction time depends on several factors, including the structures of the silicone resin (i) and the silicone rubber (iii), and the temperature. The components are typically allowed to react for a period of time sufficient to complete the condensation reaction. This means the components are allowed to react until at least about 95 mol %, more typically at least about 98 mol %, most typically at least about 99 mol %, of the silicon-bonded hydrolysable groups originally present in the silicone rubber (iii) have been consumed in the condensation reaction, as determined by $^{29}Si$ NMR spectrometry. The time of reaction is typically from about 1 to about 30 h at a temperature of from room temperature (~23±2° C.) to about 100° C. The optimum reaction time can be determined by routine experimentation.

Suitable condensation catalysts (iv) are described in further detail below, and suitable organic solvents (v) are described above in the context of rubber-modified silicone resin (A') above. The concentration of the condensation catalyst (iv) is sufficient to catalyze the condensation reaction of the silicone resin (i) with the silicone rubber (iii). Typically, the concentration of the condensation catalyst (iv) is from about 0.01 to about 2% (w/w), more typically from about 0.01 to about 1% (w/w), most typically from about 0.05 to about 0.2% (w/w), based on the weight of the silicon resin (i). The concentration of the organic solvent (v) is typically from about 10 to about 95% (w/w), more typically from about 20 to about 85% (w/w), most typically from about 50 to about 80% (w/w), based on the total weight of the reaction mixture.

The concentration of water in the reaction mixture depends on the nature of the groups $R^8$ in the organosilicon compound and the nature of the silicon-bonded hydrolysable groups in the silicone rubber. When the silicone resin (i) contains hydrolysable groups, the concentration of water is sufficient to effect hydrolysis of the hydrolysable groups in the silicon resin (i) and the silicone rubber (iii). For example, the concentration of water is typically from about 0.01 to about 3 moles, more typically from about 0.05 to about 1 moles, per mole of hydrolysable group in the silicone resin (i) and the silicone rubber (iii) combined. When the silicone resin (i) does not contain hydrolysable groups, only a trace amount, e.g., 100 ppm, of water is required in the reaction mixture. Trace amounts of water are normally present in the reactants and/or solvent.

As set forth above, the condensation-cured silicone composition can further comprise the reaction product of the cross-linking agent (B'). The cross-linking agent (B') can have the formula $R^7{}_qSiX_{4-q}$, wherein $R^7$ is $C_1$ to $C_8$ hydrocarbyl or $C_1$ to $C_8$ halogen-substituted hydrocarbyl, X is a hydrolysable group, and q is 0 or 1. The hydrocarbyl and halogen-substituted hydrocarbyl groups represented by $R^7$, and the hydrolysable groups represented by X are as described and exemplified above.

Specific examples of cross-linking agents (B') include, but are not limited to, alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O—N=C(CH_3)CH_2CH_3]_3$, $Si[O—N=C(CH_3)CH_2CH_3]_4$, and $CH_2=CHSi[O—N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The cross-linking agent (B') can be a single silane or a mixture of two or more different silanes, each as described above. Also, methods of preparing tri- and tetra-functional silanes are well known in the art; many of these silanes are commercially available.

When used, the concentration of the cross-linking agent (B') prior to formation of the condensation-cured silicone composition is sufficient to cure (cross-link) the condensation-cured silicone resin. The exact amount of the cross-linking agent (B') depends on the desired extent of cure, which generally increases as the ratio of the number of moles of silicon-bonded hydrolysable groups in the cross-linking agent (B') to the number of moles of silicon-bonded hydrogen atoms, hydroxy groups, or hydrolysable groups in the silicone resin (A") increases. Typically, the concentration of the cross-linking agent (B') is sufficient to provide from about 0.2 to about 4 moles of silicon-bonded hydrolysable groups per mole of silicon-bonded hydrogen atoms, hydroxy groups, or hydrolysable groups in the silicone resin (A"). The optimum amount of the cross-linking agent (B') can be readily determined by routine experimentation.

Condensation catalyst (C') can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst (C')

can be selected from tin(II) and tin(IV) compounds such as tin dilaurate, tin dioctoate, and tetrabutyl tin; and titanium compounds such as titanium tetrabutoxide.

When present, the concentration of the condensation catalyst (C') is typically from about 0.1 to about 10% (w/w), more typically from about 0.5 to about 5% (w/w), most typically from about 1 to about 3% (w/w), based on the total weight of the silicone resin (A").

When the condensation-cured silicone composition is formed in the presence of the condensation catalyst (C'), the condensation-cured silicone composition is typically formed from a two-part composition where the silicone resin (A") and condensation catalyst (C') are in separate parts.

The condensation-cured silicone composition of the present invention can comprise additional ingredients, as known in the art and as described above for the hydrosilylation-cured silicone composition.

In yet another embodiment, the silicone composition may be a free radical-cured silicone composition. Examples of free radical-cured silicone compositions include peroxide-cured silicone compositions, radiation-cured silicone compositions containing a free radical photoinitiator, and high energy radiation-cured silicone compositions. Typically, the free radical-cured silicone composition comprises the reaction product of a silicone resin (A"") and, optionally, a cross-linking agent (B") and/or a free radical initiator (C") (e.g., a free radical photoinitiator or organic peroxide).

The silicone resin (A"") can be any silicone resin that can be cured (i.e., cross-linked) by at least one method selected from (i) exposing the silicone resin to radiation having a wavelength of from about 150 to about 800 nm in the presence of a free radical photoinitiator, (ii) heating the silicone resin (A"") in the presence of an organic peroxide, and (iii) exposing the silicone resin (A"") to an electron beam. The silicone resin (A"") is typically a copolymer containing T siloxane units and/or Q siloxane units in combination with M and/or D siloxane units.

For example, the silicone resin (A"") may have the formula:

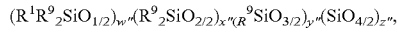

wherein $R^1$ is as defined and exemplified above, $R^9$ is $R^1$, alkenyl, or alkynyl, w" is from 0 to about 0.99, x" is from 0 to about 0.99, y" is from 0 to about 0.99, and z" is from 0 to about 0.85, and w"+x"+y"+z"=1.

The alkenyl groups represented by $R^9$, which may be the same or different, are as defined and exemplified in the description of $R^2$ above.

The alkynyl groups represented by $R^9$, which may be the same or different, typically have from 2 to about 10 carbon atoms, more typically from 2 to 6 carbon atoms, and are exemplified by, but not limited to, ethynyl, propynyl, butynyl, hexynyl, and octynyl.

The silicone resin (A"") typically has a number-average molecular weight ($M_n$) of at least about 300, more typically from about 500 to about 10,000, most typically about 1,000 to about 3,000, where the molecular weight is determined by gel permeation chromatography employing a refractive index detector and silicone resin (MQ) standards.

The silicone resin (A"") can contain less than about 10% (w/w), more typically less than about 5% (w/w), most typically less than about 2% (w/w), of silicon-bonded hydroxy groups, as determined by $^{29}$Si NMR.

Specific examples of silicone resins (A"") that are suitable for purposes of the present invention include, but are not limited to, silicone resins having the following formulae:

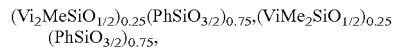

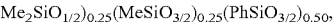

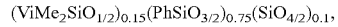

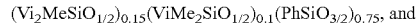

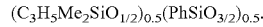

wherein Me is methyl, Vi is vinyl, Ph is phenyl, and the numerical subscripts outside the parenthesis denote mole fractions. The sequence of units in the preceding formulae is not to be viewed in any way as limiting to the scope of the invention.

The free radical-cured silicone composition of the present method can comprise additional ingredients including, but are not limited to, silicone rubbers; unsaturated compounds; free radical initiators; organic solvents; UV stabilizers; sensitizers; dyes; flame retardants; antioxidants; fillers, such as reinforcing fillers, extending fillers, and conductive fillers; and adhesion promoters.

The free radical-cured silicone composition can further comprise the reaction product of an unsaturated compound selected from (i) at least one organosilicon compound having at least one silicon-bonded alkenyl group per molecule, (ii) at least one organic compound having at least one aliphatic carbon-carbon double bond per molecule, and (iii) mixtures comprising (i) and (ii), wherein the unsaturated compound has a molecular weight less than about 500. More typically, the unsaturated compound has a molecular weight less than about 400 or less than about 300. Also, the unsaturated compound can have a linear, branched, or cyclic structure.

The organosilicon compound (i) can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, more typically from 3 to 10 silicon atoms, most typically from 3 to 4 silicon atoms. In acyclic polysilanes and polysiloxanes, the silicon-bonded alkenyl group(s) can be located at terminal, pendant, or at both terminal and pendant positions.

Specific examples of organosilanes include, but are not limited to, silanes having the following formulae:

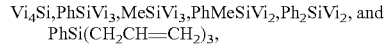

wherein Me is methyl, Ph is phenyl, and Vi is vinyl.

Specific examples of organosiloxanes include, but are not limited to, siloxanes having the following formulae:

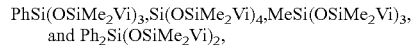

wherein Me is methyl, Vi is vinyl, and Ph is phenyl.

The organic compound can be any organic compound containing at least one aliphatic carbon-carbon double bond per molecule, provided the compound does not prevent the silicone resin (A"") from curing to form a silicone resin film. The organic compound can be an alkene, a diene, a triene, or a polyene. Further, in acyclic organic compounds, the carbon-carbon double bond(s) can be located at terminal, pendant, or at both terminal and pendant positions.

The organic compound can contain one or more functional groups other than the aliphatic carbon-carbon double bond. Examples of suitable functional groups include, but are not limited to, —O—, >C=O, —CHO, —CO$_2$—, —C≡N, —NO$_2$, >C=C<, —C≡C—, —F, —Cl, —Br, and —I. The suitability of a particular unsaturated organic compound for use in the free-radical cured silicone composition of the present invention can be readily determined by routine experimentation.

The organic compound can have a liquid or solid state at room temperature. Also, the organic compound can be soluble, partially soluble, or insoluble in the free-radical cured silicone composition prior to curing. The normal boiling point of the organic compound, which depends on the molecular weight, structure, and number and nature of functional groups in the compound, can vary over a wide range. Typically, the organic compound has a normal boiling point greater than the cure temperature of the composition. Otherwise, appreciable amounts of the organic compound may be removed by volatilization during cure.

Examples of organic compounds containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

The concentration of the unsaturated compound is typically from 0 to about 70% (w/w), more typically from about 10 to about 50% (w/w), most typically from about 20 to about 40% (w/w), based on the total weight of the free radical-cured silicone composition prior to curing.

Methods of preparing organosilanes and organosiloxanes containing silicon-bonded alkenyl groups, and organic compounds containing aliphatic carbon-carbon double bonds are well known in the art; many of these compounds are commercially available.

The free radical initiator is typically a free radical photoinitiator or an organic peroxide. Further, the free radical photoinitiator can be any free radical photoinitiator capable of initiating cure (cross-linking) of the silicone resin upon exposure to radiation having a wavelength of from about 200 to about 800 nm.

Examples of free radical photoinitiators include, but are not limited to, benzophenone; 4,4'-bis(dimethylamino)benzophenone; halogenated benzophenones; acetophenone; α-hydroxyacetophenone; chloro acetophenones, such as dichloroacetophenones and trichloroacetophenones; dialkoxyacetophenones, such as 2,2-diethoxyacetophenone; α-hydroxyalkylphenones, such as 2-hydroxy-2-methyl-1-phenyl-1-propanone and 1-hydroxycyclohexyl phenyl ketone; α-aminoalkylphenones, such as 2-methyl-4'-(methylthio)-2-morpholiniopropiophenone; benzoin; benzoin ethers, such as benzoin methyl ether, benzoin ethyl ether, and benzoin isobutyl ether; benzil ketals, such as 2,2-dimethoxy-2-phenylacetophenone; acylphosphinoxides, such as diphenyl(2,4,6-trimethylbenzoyl)phosphine oxide; xanthone derivatives; thioxanthone derivatives; fluorenone derivatives; methyl phenyl glyoxylate; acetonaphthone; anthraquinone derivatives; sulfonyl chlorides of aromatic compounds; and O-acyl α-oximinoketones, such as 1-phenyl-1,2-propanedione-2-(O-ethoxycarbonyl)oxime.

The free radical photoinitiator can also be a polysilane, such as the phenylmethylpolysilanes defined by West in U.S. Pat. No. 4,260,780, the disclosure of which as it relates to the phenylmethylpolysilanes is hereby incorporated by reference; the aminated methylpolysilanes defined by Baney et al. in U.S. Pat. No. 4,314,956, the disclosure of which is hereby incorporated by reference as it relates to aminated methylpolysilanes; the methylpolysilanes of Peterson et al. in U.S. Pat. No. 4,276,424, the disclosure of which is hereby incorporated by reference as it relates to methylpolysilanes; and the polysilastyrene defined by West et al. in U.S. Pat. No. 4,324,901, the disclosure of which is hereby incorporated by reference as it relates to polysilastyrene.

The free radical photoinitiator can be a single free radical photoinitiator or a mixture comprising two or more different free radical photoinitiators. The concentration of the free radical photoinitiator is typically from about 0.1 to about 6% (w/w), more typically from about 1 to about 3% (w/w), based on the weight of the silicone resin (A'''').

The free radical initiator can also be an organic peroxide. Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aroyl peroxides such as t-butyl perbenzoate, t-butyl peracetate, and t-butyl peroctoate.

The organic peroxide can be a single peroxide or a mixture comprising two or more different organic peroxides. The concentration of the organic peroxide is typically from about 0.1 to about 5% (w/w), more typically from about 0.2 to about 2% (w/w), based on the weight of the silicone resin (A'''').

The free radical-cured silicone composition can further be formed in the presence of at least one organic solvent. The organic solvent can be any aprotic or dipolar aprotic organic solvent that does not react with the silicone resin (A'''') or additional ingredient(s) and is miscible with the silicone resin (A''''). Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The organic solvent can be a single organic solvent or a mixture comprising two or more different organic solvents, each as described above.

The concentration of the organic solvent is typically from 0 to about 99% (w/w), more typically from about 30 to about 80% (w/w), most typically from about 45 to about 60% (w/w), based on the total weight of the free radical-cured silicone composition prior to curing.

When the free-radical cured silicone composition described above is formed from one or more additional ingredients, for example, a free radical initiator, the free-radical cured silicone composition may be formed from a one-part composition comprising the silicone resin (A'''') and optional ingredient(s) in a single part, or a multi-part composition comprising the components in two or more parts.

In addition to the silicone compositions set forth above, other cured silicone compositions are also suitable for purposes of the present invention. For example, suitable silicone compositions, for purposes of the present invention, are disclosed in PCT Application No. JP2006/315901, the disclosures of which, as they relate to silicone compositions, are hereby incorporated by reference. Further, polysilsesquioxanes may also be suitable for purposes of the present invention.

As set forth above, the silicone layer 14 may be the reinforced silicone layer 14 that comprises the fiber reinforcement. The fiber reinforcement can be any reinforcement comprising fibers. The fiber reinforcement typically has a Young's modulus at 25° C. of at least about 3 GPa. For example, the reinforcement typically has a Young's modulus at 25° C. of from about 3 to about 1,000 GPa, more typically from about 3 to about 200 GPa, most typically from about 10 to about 100 GPa. Moreover, the reinforcement typically has a tensile strength at 25° C. of at least about 50 MPa. For example, the reinforcement typically has a tensile strength at 25° C. of from about 50 to about 10,000 MPa, more typically from about 50 to about 1,000 MPa, most typically from about 50 to about 500 MPa.

The fiber reinforcement can be a woven fabric, e.g., a cloth; a nonwoven fabric, e.g., a mat or roving; or loose (individual) fibers. The fibers in the reinforcement are typically cylindrical in shape and have a diameter of from about 1 to about 100 μm, more typically from about 1 to about 20 μm, most typically form about 1 to about 10 μm. Loose fibers are typically continuous, meaning the fibers extend throughout the reinforced silicone layer 14 in a generally unbroken manner.

The fiber reinforcement is typically heat-treated prior to use to remove organic contaminants. For example, the fiber reinforcement is typically heated in air at an elevated temperature, for example, about 575° C., for a suitable period of time, for example about 2 hours.

Specific examples of fiber reinforcements that are suitable for purposes of the present invention include, but are not limited to, reinforcements comprising glass fibers; quartz fibers; graphite fibers; nylon fibers; polyester fibers; aramid fibers, such as Kevlar® and Nomex®; polyethylene fibers; polypropylene fibers; silicon carbide fibers; alumina fibers; silicon oxycarbide fibers; metal wires such as steel wires; and combinations thereof.

As set forth above, the fiber reinforcement is typically impregnated with the silicone composition. The fiber reinforcement may be impregnated with the silicone composition using a variety of methods. For example, the silicone composition, as described above, may be applied to a release liner to form a silicone film. The silicone composition can be applied to the release liner using conventional coating techniques, such as spin coating, dipping, spraying, brushing, or screen-printing. The silicone composition is applied in an amount sufficient to impregnate the fiber reinforcement. The release liner can be any rigid or flexible material having a surface from which the reinforced silicone layer 14 can be removed without damage by delamination after the silicone composition is cured. Examples of release liners include, but are not limited to, nylon, polyethyleneterephthalate, and polyimide.

The fiber reinforcement is then embedded in the silicone film, thereby forming an embedded fiber reinforcement. The fiber reinforcement can be embedded in the silicone film by simply placing the fiber reinforcement on the silicone film and allowing the silicone composition to impregnate the reinforcement. However, it is to be appreciated that the fiber reinforcement may be first deposited on the release liner, followed by the application of the silicone composition onto the fiber reinforcement. In another embodiment, when the fiber reinforcement is woven or nonwoven fabric, the reinforcement can be impregnated with the silicone composition by passing it through the silicone composition without the used of the release liner. In this embodiment, the fabric is typically passed through the silicone composition at a rate of from about 1 to about 1,000 cm/s at room temperature (~23±2° C.).

The embedded fiber reinforcement is then optionally degassed. The embedded fiber reinforcement can be degassed by subjecting it to a vacuum at a temperature of from room temperature (~23±2° C.) to about 60° C., for a period of time sufficient to remove entrapped air in the embedded reinforcement. For example, the embedded fiber reinforcement can typically be degassed by subjecting it to a pressure of from about 1,000 to about 20,000 Pa for about 5 to about 60 min. at room temperature.

After degassing, additional silicone composition is applied to the embedded fiber reinforcement to form an impregnated fiber reinforcement. The silicone composition can be applied to the degassed embedded fiber reinforcement using conventional methods, as described above. Additional cycles of degassing and application of silicone composition may also occur.

The impregnated fiber reinforcement may also be compressed to remove excess silicone composition and/or entrapped air, and to reduce the thickness of the impregnated fiber reinforcement. The impregnated fiber reinforcement can be compressed using conventional equipment such as a stainless steel roller, hydraulic press, rubber roller, or laminating roll set. The impregnated fiber reinforcement is typically compressed at a pressure of from about 1,000 Pa to about 10 MPa and at a temperature of from room temperature (~23±2° C.) to about 50° C.

The impregnated fiber reinforcement is heated at a temperature sufficient to cure the silicone composition and form the reinforced silicone layer 14. The impregnated fiber reinforcement can be heated at atmospheric, sub-atmospheric, or supra-atmospheric pressure. The impregnated fiber reinforcement is typically heated at a temperature of from room temperature (~23±2° C.) to about 250° C., more typically from room temperature to about 200° C., most typically from room temperature to about 150° C., at atmospheric pressure. The impregnated fiber reinforcement is heated for a length of time sufficient to cure (cross-link) the silicone composition. For example, the impregnated fiber reinforcement is typically heated at a temperature of from about 150 to about 200° C. for a time of from about 0.1 to about 3 hours.

Alternatively, the impregnated fiber reinforcement can be heated in a vacuum at a temperature of from about 100 to about 200° C. and a pressure of from about 1,000 to about 20,000 Pa for a time of from about 0.5 to about 3 hours to form the reinforced silicone layer 14. The impregnated fiber reinforcement can be heated in the vacuum using a conventional vacuum bagging process. In a typical process, a bleeder (e.g., polyester) is applied over the impregnated fiber reinforcement, a breather (e.g., nylon, polyester) is applied over the bleeder, a vacuum bagging film (e.g., nylon) equipped with a vacuum nozzle is applied over the breather, the assembly is sealed with tape, a vacuum (e.g., about 1,000 Pa) is applied to the sealed assembly, and the evacuated bag is heated as described above.

In another embodiment, when the silicone layer 14 does not include the fiber reinforcement, the silicone layer may be formed by applying the silicone composition to a release liner to form the silicone film. The silicone film may be degassed and/or compressed in the same manner as set forth above, in the context of the reinforced silicone layer 14. Typically, the silicone film is then heated, in the same manner as set forth above in the context of the reinforced silicone layer 14, to cure the silicone composition and to thereby form the silicone layer 14.

The thickness of the silicone layer 14 is dependent upon the intended application for the composite article 10. Typically, the silicone layer 14 has a thickness of at least about 1 mil, more typically from about 2 to about 100 mils, most typically about 5 mils.

As set forth above, the silicone layer 14 is disposed adjacent to the first glass layer 12. More specifically, the silicone layer 14 is adhered to the first glass layer 12. In one embodiment, as shown in FIG. 1 and as set forth above, the silicone layer 14 may be directly adhered to the first glass layer 12. In this embodiment, the silicone composition includes at least one functional group prior to curing for adhering the cured silicone composition, and the silicone layer 14, to the first glass layer 12. The at least one functional group may be selected from the group of, but is not limited to, silanol groups, alkoxy groups, epoxy groups, silicon hydride groups, acetoxy groups, and combinations thereof.

To adhere the silicone layer 14 directly upon the first glass layer 12, the silicone film may be formed as described above. Likewise, when the silicone layer 14 is the reinforced silicone layer 14, the impregnated fiber reinforcement may be formed as described above. The silicone film or impregnated fiber reinforcement may then be disposed on the first glass layer 12 prior to completely curing the silicone film or impregnated fiber reinforcement. Once the silicone film or impregnated fiber reinforcement is disposed on the first glass layer 12, the silicone film or impregnated fiber reinforcement may be heated to cure the silicone composition and form the silicone layer 14 or reinforced silicone layer 14 and to adhere the silicone layer 14 or reinforced silicone layer 14 onto the first glass layer 12.

Figure 2:
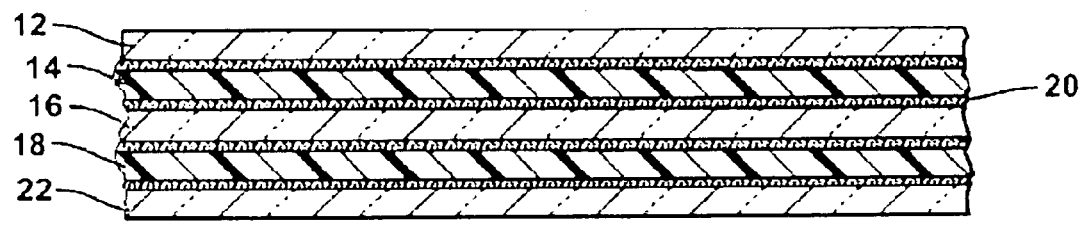
FIG. 2 is a cross-sectional side view of another embodiment of the composite article of the present invention.

In another embodiment, as shown in FIG. 2, the composite article 10 may further include an adhesive layer 20 disposed between the silicone layer 14 and the first glass layer 12. More specifically, in this embodiment, the silicone layer 14 is adhered to the first glass layer 12 with the adhesive layer 20. The adhesive layer 20 typically comprises a silicone-based adhesive; however, it is to be appreciated that any adhesive suitable for adhering silicone to glass is suitable for purposes of the present invention. The silicone-based adhesive may provide further fire-resistance to the composite article 10 that may not be possible by using primarily carbon-based adhesives. The silicone-based adhesive typically includes at least one functional group for adhering the adhesive layer 20 to the silicone layer 14, and also for adhering the adhesive layer 20 to the first glass layer 12. The at least one functional group may be selected from the group of, but is not limited to, silanol groups, alkoxy groups, epoxy groups, silicon hydride groups, acetoxy groups, and combinations thereof. Such silicone-based adhesives are known in the art. The silicone-based adhesive may be provided as a one part or a multi-part system. In one embodiment, the adhesive may be formed from the same silicone composition that is used to form the silicone layer 14.

As shown in FIG. 1, the composite article 10 further comprises a second glass layer 16 formed from glass. The second glass layer 16 is disposed adjacent to the silicone layer 14, spaced from and substantially parallel to the first glass layer 12. That is, the silicone layer 14 is typically sandwiched between the first glass layer 12 and the second glass layer 16 to protect the silicone layer 14 from scratching or other damage. The second glass layer 16 may be the same as or different from the first glass layer 12, and the glass used to form the second glass layer 16 may be the same as or different from the glass used to form the first glass layer 12. For example, the first glass layer 12 and the second glass layer 16 may have different thicknesses, and may be formed from different types of glass that are described above. The silicone layer 14 and the second glass layer 16 may be adhered in the same manner that the silicone layer 14 and first glass layer 12 are adhered.

As also shown in FIG. 1, the composite article 10 further comprises an organic layer 18. The organic layer 18 is disposed adjacent to the second glass layer 16, spaced from and substantially parallel to the silicone layer 14. The organic layer 18 provides the composite article with excellent impact strength. The organic layer 18 comprises a cured organic composition. Typically, the cured organic composition comprises an organic polymer. Examples of suitable organic polymers include, but not limited to, those selected from the group of polycarbonate, polymethyl methacrylate, polyimide, polyamide, polyvinyl acrylate, polyvinyl butyrate, polytetrafluoroethylene, polysulfone, and combinations thereof. Typically, the organic polymer is present in the cured organic composition in an amount of at least 20% by weight, more typically from about 60 to about 90% by weight, based on a total weight of the cured organic composition. The balance of the organic layer 18 may be other polymers or non-polymeric components, such as fillers, pigments, plasticizers, etc. While the organic layer may include other components, such as another fiber reinforcement that is the same as or different from the fiber reinforcement described above for the reinforced silicone layer 14, the organic layer 18 is typically free of such fiber reinforcements.

The organic layer 18 typically has a thickness of at least about 0.5 mil, more typically from about 1 to about 500 mils, most typically from about 4 to about 150 mils. The organic layer 18 may be adhered to the second glass layer 16 in the same manner that the silicone layer 14 is adhered to the first glass layer 12. For example, as shown in FIG. 2, an additional adhesive layer 20 may be disposed between the organic layer 18 and the second glass layer 16. The adhesive layer 20 is described above.

The composite article may further comprise a third glass layer 22 disposed adjacent to the organic layer 18, spaced from and substantially parallel to the second glass layer 16. That is, the organic layer 18 may be sandwiched between the second glass layer 16 and the third glass layer 22. However, the organic layer 18 is generally sufficiently resistant to scratching and damage that the third glass layer 22 may be unnecessary. However, if present, the third glass layer may be identical to the first glass layer 12 and the second glass layer 16.

Although not shown, in one embodiment, the composite article 10 may further comprise an additional silicone layer 14 or layers 14, in order to provide additional fire resistance to the composite article 10. The composite article 10 may further comprise an additional organic layer 18 or layers 18, in order to provide additional impact strength to the composite article 10.

The composite articles 10 of the present invention have excellent impact strength. More specifically, the composite articles 10 of the present invention can typically withstand the impact of a 5 lb steel ball dropped from a height of at least 6 feet, more typically from about 6 feet to about 20 feet, most typically from about 8 feet to about 14 feet, in accordance with ANSI Z26.1. It is to be appreciated that impact strength can also be evaluated using different testing methods, such as the one specified in ANSI Z97.1.

The composite articles 10 of the present invention also have excellent fire resistance. More specifically, the composite articles 10 of the present invention typically have a fire rating of at least 20 minutes, typically at least 30 minutes, in accordance with at least one of ASTM E 119-05a without a hose stream impact, ASTM E 2010-01 with a hose stream impact, and ASTM E 2074-00. The presence of the fiber reinforcement in the silicone layer 14 further enhances fire resistance of the composite articles 10. The fire rating is an indication of the fire resistance of the composite article 10 and is a measurement of how long it takes to form a breach in the composite article 10 when exposed to heat provided by a furnace. To establish a fire rating in accordance with ASTM E 119-05a, the composite article 10 is fitted onto one opening of the furnace, and a flame is started in the furnace to raise the temperature inside the furnace from room temperature to about 200° F., and a supply of fuel to the flame is gradually increased to generate a predetermined temperature profile and to reach a temperature of about 1950° F. at the end of a period of 190 minutes. Although the breach will form in the composite article 10 during exposure to the heat, the glass used to form the glass layers 12, 18 of the composite article 10 typically melts, and the silicone layer 14 typically chars.

While the composite article 10 of the instant invention may be made through the methods described above, the present invention provides another method of making a composite article 10. It is to be appreciated that the composite articles made through the following method are not limited to the composite articles 10 described above. In particular, the following method can be used not only to make the specific composite articles 10 described herein, but can also be used to make any composite article including a first glass layer and a polymeric layer that is disposed adjacent to the first glass layer. However, for illustrative purposes, the additional method is described herein in the context of making the composite article 10 of the present invention.

For the additional method, a dual-compartment chamber 24 is provided. More specifically, the chamber 24 defines an interior space that is divided into a first compartment 26 and a second compartment 28. Typically, each compartment 26, 28 includes a port 30, 32 that enables pressurization or evacuation of the respective compartment 26, 28.

The first compartment 26 and the second compartment 28 are separated by a polymeric separator 34. The polymeric separator 34 is capable of manipulation within the chamber 24 through pressure differentials between the compartments 26, 28. More specifically, by varying pressure in the first compartment 26 or the second compartment 28, the position of the polymeric separator 34 can be moved within the interior space of the chamber 24. The polymeric separator 34 is typically formed from an elastic material, such as a rubber, that is capable of returning to an original state after manipulation.

Typically, the chamber 24 further includes a heating element 36. The heating element 36 may be disposed in the first compartment 26. The heating element is provided to heat the composite article 10 formed in the chamber 24 and to thereby cure the silicone layer 14, organic layer 18, and/or the adhesive layer(s) 20.

To make composite articles 10 through the instant method, at a minimum, the silicone layer 14 is disposed adjacent to the first glass layer 12. The silicone layer 14 may be in a cured state (such as when the adhesive layer 20 is used to adhere the first glass layer 12 and the silicone layer 14) or uncured state (such as when the first glass layer 12 and the silicone layer 14 are directly adhered). In the context of the composite article 10 of the instant invention, the various layers 12, 14, 16, 18, 22 of the composite article 10 may be assembled as described above, with the silicone layer 14 and/or the organic layer 18 directly adhered to the respective glass layers 12, 16, 22 or adhered through the adhesive layers 20, but without heating the composite articles 10 to cure the silicone composition or the organic composition in the respective layers 14, 18.

The first glass layer 12 is disposed in the first compartment 26, and the silicone layer 14 is disposed adjacent to the first glass layer 12. The step of disposing the first glass layer 12 in the first compartment 26 may occur before or after the step of disposing the silicone layer 14 adjacent to the first glass layer 12. Stated differently, in the context of the composite article 10 of the instant invention, the composite article 10 may be assembled within the chamber 24 or may be assembled prior to the step of disposing the first glass layer 12 in the first compartment 26.

Once the various layers 12, 14, 16, 18, 22 of the composite article 10 are assembled and disposed in the first compartment 26, the second compartment 28 may be evacuated to move the polymeric separator 34 away from the composite article 10 and to expand the volume of the first compartment 26. The first chamber 26 may then be evacuated while maintaining a vacuum in the second chamber 28, which functions to degas the composite article 10 and to maintain the polymeric separator 34 in an unobtrusive position while the first compartment 26 is being evacuated.

Once the first compartment 26 is evacuated and any degassing of the composite article 10 is performed, pressure is applied to composite article 10 with the polymeric separator 34. More specifically, the step of applying mechanical pressure typically comprises creating a pressure differential between the first chamber and the second chamber. Typically, the pressure differential is created by venting the second compartment 28, thereby causing the vacuum in the first compartment 26 to pull the polymeric separator 34 into physical contact with composite article 10. It is to be appreciated that the step of creating the pressure differential may comprise evacuating the first chamber 26 without evacuating the second chamber 28, and that other methods of applying pressure to the composite article 10 with the polymeric separator 34 may be accomplished than through the methods described herein. For example, the second chamber 28 may be pressurized while the first chamber 26 is evacuated.

The method may further include the step of heating the composite article 10 with the heating element 36. The step of heating functions to cure the silicone composition in the silicone layer 14, the organic composition in the organic layer 18, and/or the adhesive layer(s) 20. The step of heating may be performed while maintaining pressure on the composite article 10 with the polymeric separator 34. Once the necessary layers in the composite article 10 are cured, the pressure may be released and the composite article 10 may be removed from the chamber 24. Alternatively, the step of heating the composite article 10 with the heating element 36 may occur after the pressure on the composite article 10 has been released. To most efficiently heat the composite article 10 with the heating element 36, the composite article 10 typically sets on the heating element 36 in the first compartment 26.

The following examples are meant to illustrate the invention and are not to be viewed in any way as limiting to the scope of the invention.

EXAMPLES

Composite articles are formed by providing a series of glass layers, a reinforced silicone layer, an organic layer, and adhesive layers. More specifically, glass layers are formed from annealed float glass having a thickness of about 0.125 inch. The reinforced silicone layers include a cured silicone composition and fiber reinforcement. The cured silicone composition comprises the reaction product of a vinyl-terminated phenylsilsesquioxane resin crosslinked by a SiH-functional crosslinker, and is commercially available from Dow Corning Corporation of Midland, Mich. The fiber reinforcement comprises a Style 106 glass fabric and has a thickness of about 1.5 mils. The adhesive layers, prior to curing, comprise about 30% by weight of SiVi-terminated polydimethylsiloxane and about 70% by weight of a SiMe$_2$Vi and SiMe$_3$-terminated polydimethylsiloxane. The adhesive layers are provided on a release liner in order to permit handling of the adhesive layers. The organic layer is formed from about 100% by weight polycarbonate or about 100% by weight polymethyl methacrylate.

Figure 3:
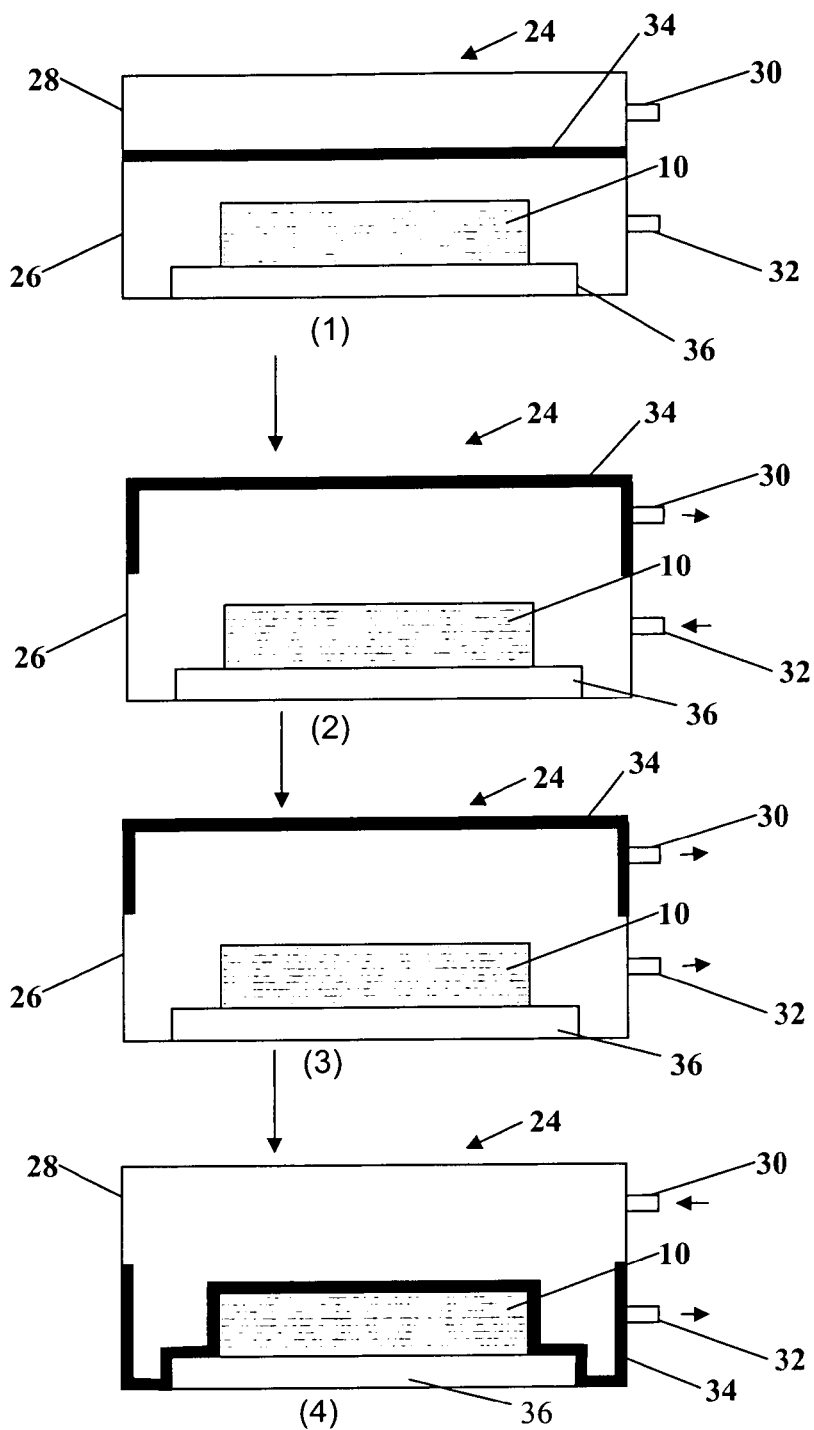
FIG. 3 is a schematic representation of one embodiment of a method of the present invention.

Examples are made with the following configuration of layers:

Example 1: G/AFA/G/ACA/G
Example 2: G/AFA/G/AMA/G
Comparative Example: G/AFA/G where G indicates a glass layer, A indicates an adhesive layer, F indicates a reinforced silicone layer, C indicates a 0.125 inch thick polycarbonate layer, and M indicates a 0.25 inch thick polymethyl methacrylate layer. A dual-compartment chamber 24, as shown in FIG. 3, is provided, and the composite article is placed in the first compartment 26 of the chamber 24. The sequence illustrated in FIG. 3 is followed. At the end of the sequence, an interior space of the chamber 24 is heated to a temperature of about 120° C. and kept at temperature for about 1 hour. The temperature is then raised to about 150° C. and kept at temperature for about 1 hour. The composite article is then cooled in the chamber 24 overnight before removing from the chamber 24. The composite article is mounted on a frame for a steel ball drop test in accordance with ANSI Z26.1, where a five pound steel ball is dropped from different heights and impacts the composite article to determine an ability of the composite article to withstand such impact. The results for the various examples are set forth in Table 1.

TABLE 1

| Example | 3 feet impact | 6 feet impact | 9 feet impact | 12 feet impact |
|---|---|---|---|---|
| Comparative Example | Pass | Fail | — | — |
| Example 1 | — | — | — | Pass |
| Example 2 | — | — | — | Pass |

Obviously, many modifications and variations of the present invention are possible in light of the above teachings, and the invention may be practiced otherwise than as specifically described within the scope of the appended claims.

What is claimed is:

1. A composite article comprising:
a first glass layer;
a silicone layer disposed adjacent and adhered to said first glass layer and comprising a cured silicone composition;
a second glass layer disposed adjacent and adhered to said silicone layer, spaced from and substantially parallel to said first glass layer such that said silicone layer is sandwiched between said first and second glass layers; and
an organic layer disposed adjacent and adhered to said second glass layer opposite said silicone layer, said organic layer comprising a cured organic composition.

2. A composite article as set forth in claim 1 wherein said silicone layer is further defined as a reinforced silicone layer comprising a fiber reinforcement.

3. A composite article as set forth in claim 2 wherein said fiber reinforcement is impregnated with said cured silicone composition.

4. A composite article as set forth in claim 1 wherein said cured silicone composition is further defined as a hydrosilylation-cured silicone composition.

5. A composite article as set forth in claim 1 wherein said cured silicone composition is further defined as a condensation-cured silicone composition.

6. A composite article as set forth in claim 5 wherein said condensation-cured silicone composition further includes an inorganic filler in particulate form.

7. A composite article as set forth in claim 1 wherein said cured silicone composition is further defined as a free radical-cured silicone composition.

8. A composite article as set forth in claim 1 wherein said silicone composition includes at least one functional group prior to curing for adhering said cured silicone composition to said first glass layer.

9. A composite article as set forth in claim 8 wherein said at least one functional group is selected from the group of silanol groups, alkoxy groups, epoxy groups, silicon hydride groups, acetoxy groups, and combinations thereof.

10. A composite article as set forth in claim 1 further comprising an adhesive layer disposed between said silicone layer and said first glass layer.

11. A composite article as set forth in claim 10 wherein said adhesive layer comprises a silicone-based adhesive.

12. A composite article as set forth in claim 1 further comprising an adhesive layer disposed between said organic layer and said second glass layer.

13. A composite article as set forth in claim 1 wherein said cured organic composition comprises an organic polymer.

14. A composite article as set forth in claim 13 wherein said organic polymer is selected from the group of polycarbonate, polymethyl methacrylate, polyimide, polyamide, polyvinyl acrylate, polyvinyl butyrate, polytetrafluoroethylene, polysulfone, and combinations thereof.

15. A composite article as set forth in claim 13 wherein said organic polymer is present in said cured organic composition in an amount of at least 20% by weight based on a total weight of said organic layer.

16. A composite article as set forth in claim 1 further comprising a third glass layer disposed adjacent said organic layer, spaced from and substantially parallel to said second glass layer.

17. A composite article as set forth in claim 1 having a fire rating of at least 20 minutes in accordance with at least one of ASTM E 119-05a, ASTM E 2010-01, and ASTM E 2074-00.

18. A composite article as set forth in claim 1 that withstands the impact of a 5 lb steel ball dropped from a height of at least 6 feet in accordance with ANSI Z26.1.

* * * * *